(12) United States Patent
Delattre et al.

(10) Patent No.: US 11,748,848 B2
(45) Date of Patent: Sep. 5, 2023

(54) SYSTEMS AND METHODS FOR MACHINE LEARNED IMAGE CONVERSION

(71) Applicant: NINTENDO CO., LTD., Kyoto (JP)

(72) Inventors: Alexandre Delattre, Viroflay (FR); Théo Charvet, Paris (FR); Raphaël Poncet, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/845,737

(22) Filed: Jun. 21, 2022

(65) Prior Publication Data

US 2022/0335570 A1   Oct. 20, 2022

Related U.S. Application Data

(63) Continuation of application No. 16/830,032, filed on Mar. 25, 2020, now Pat. No. 11,379,951.

(51) Int. Cl.
*G06F 17/16* (2006.01)
*G06T 3/40* (2006.01)
*G06N 3/08* (2023.01)
*A63F 13/53* (2014.01)
*G06T 1/20* (2006.01)
*G06N 3/04* (2023.01)

(52) U.S. Cl.
CPC ............ *G06T 3/4046* (2013.01); *A63F 13/53* (2014.09); *G06F 17/16* (2013.01); *G06N 3/04* (2013.01); *G06N 3/08* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 8,427,497 B1 * | 4/2013 | Chin | ................ G09G 5/39 345/557 |
| 2016/0034810 A1 | 2/2016 | Hershey | |
| 2018/0098081 A1 | 4/2018 | Zhao et al. | |
| 2018/0189236 A1 | 7/2018 | Korthikanti | |
| 2019/0188526 A1 | 6/2019 | Chen | |
| 2019/0243653 A1 | 8/2019 | Sodani | |
| 2019/0373293 A1 | 12/2019 | Bortman et al. | |
| 2020/0034148 A1 | 1/2020 | Sumbul et al. | |

(Continued)

FOREIGN PATENT DOCUMENTS

WO   2019/182752   9/2019

OTHER PUBLICATIONS

Howard Andrew G. et al. "MobileNets: Efficient Convolutional Neural Networks for Mobile Vision Applications" <https://arxiv.org/abs/1704.04861>, pp. 1-9 (2017).

(Continued)

*Primary Examiner* — Joni Hsu
(74) *Attorney, Agent, or Firm* — Nixon & Vanderhye P.C.

(57) ABSTRACT

A computer system is provided for converting images through use of a trained neural network. A source image is divided into blocks and context data is added to each pixel block. The context blocks are split into channels and each channel from the same context block is added to the same activation matrix. The action matrix is then executed against a trained neural network to produce a changed activation matrix. The changed activation matrix is then used to generate a converted image.

20 Claims, 17 Drawing Sheets
(2 of 17 Drawing Sheet(s) Filed in Color)

(56) References Cited

U.S. PATENT DOCUMENTS

| | | |
|---|---|---|
| 2020/0074269 A1 | 3/2020 | Trygg |
| 2020/0092552 A1 | 3/2020 | Coelho et al. |
| 2020/0117981 A1 | 4/2020 | Arthur |
| 2021/0027425 A1 | 1/2021 | Kalchbreririer et al. |
| 2021/0073317 A1* | 3/2021 | Dazzi .................. G11C 13/003 |
| 2021/0092462 A1 | 3/2021 | Cox et al. |

OTHER PUBLICATIONS

Li, Gang et al. "Block Convolution: Towards Memory-Efficient Inference of Large-Scale CNNs on FPGA", Design, Automation And Test in Europe Conference & Exhibition, pp. 1163-1166 (2018).

Zhou Shuchang et al., "Compression of Fully-Connected Layer in Neural Network by Kronecker Product" <https://arxiv.org/pdf/1507.05775>, pp. 1-11 (2015).

International Search Report and Written Opinion of the ISA for International Application No. PCT/US2021/023939, 24 pages, dated Jun. 4, 2021.

Office Action from U.S. Appl. No. 16/829,950, 21 pages, dated Mar. 3, 2022.

* cited by examiner

SYSTEMS AND METHODS FOR MACHINE LEARNED IMAGE CONVERSION

CROSS REFERENCE(S) TO RELATED APPLICATION(S)

This application is a Continuation of U.S. patent application Ser. No. 16/830,032, filed Mar. 25, 2020, now U.S. Pat. No. 11,379,951, issued Jul. 5, 2022; which incorporates by reference an application titled "SYSTEMS AND METHODS FOR MACHINE LEARNED IMAGE CONVERSION" (U.S. application Ser. No. 16/829,950 filed Mar. 25, 2020, now U.S. Pat. No. 11,494,875, issued Nov. 8, 2022).

TECHNICAL OVERVIEW

The technology described herein relates to machine learning and using machine learning to convert one dataset or signal into another dataset or signal. More particularly, the technology described herein relates to applying block transforms to such datasets or signal. Applications of the technology include converting images of one resolution into another (e.g., higher) resolution and may be used in real-time applications from images generated by, for example, a video game engine.

INTRODUCTION

Machine learning can give computers the ability "learn" a specific task without expressly programming the computer for that task. One type of machine learning system is called convolutional neural networks (CNNs)—a class of deep learning neural networks. Such networks (and other forms of machine learning) can be used to, for example, help with automatically recognizing whether a cat is in a photograph. The learning takes places by using thousands or millions of photos to "train" the model to recognize when a cat is in a photograph. While this can be a powerful tool, the resulting processing of using a trained model (and training the model) can still be computationally expensive when deployed in a real-time environment.

Image up-conversion is a technique that allows for conversion of images produced in a first resolution (e.g., 540p resolution or 960×540 with 0.5 megapixels) to a higher resolution (e.g., 1080p resolution, 1920×1080, with 2.1 megapixels). This process can be used to show images of the first resolution on a higher resolution display. Thus, for example, a 540p image can be displayed on a 1080p television and (depending on the nature of the up-conversion process) may be shown with increased graphical fidelity as compared to if the 540p image were displayed directly with traditional (e.g., linear) upscaling on a 540 television. Different techniques for image up-conversion can present a tradeoff between speed (e.g., how long the process takes for converting a given image) and the quality of the up-converted image. For example, if a process for up-converting is performed in real-time (e.g., such as during a video game), then the image quality of the resulting up-converted image may suffer.

Accordingly, it will be appreciated that new and improved techniques, systems, and processes are continually sought after in these areas of technology.

SUMMARY

In certain example embodiments, a computer system is provided for converting images from a first resolution into a second resolution through use of a trained neural network. The source image is divided into blocks and context data is added to each pixel block. The context blocks are split into channels and each channel from the same context block is inserted into the same activation matrix. The activation matrix is then executed or applied against a trained neural network to produce a changed (e.g., output) activation matrix. The changed activation matrix is then used to generate output channels to construct an image that is in the second resolution. These techniques may occur during runtime and in real-time with generation of the source image.

In certain example embodiments, a computer system for training neural networks for transform signal data (e.g., images) is provided. For example, transforming images of a first resolution to a second resolution. Target signal data (e.g., target images) are stored to a database or other non-transitory medium. For images, they may be in a resolution that is a target resolution. The computer system includes a processing system with at least one hardware processor. When training for image transformation, the computer system is configured to divide the first image into a first plurality of pixel blocks. Each one of the first plurality of pixel blocks is split into a plurality of separate output channels to form target output data. Based on one of the plurality of separate output channels a second image is generated that is at the second resolution. A plurality of context blocks are generated from the second image. The plurality of context blocks are then split into a plurality of separate input channels and used to train a neural network by using the plurality of separate input channels until convergence of the neural network to the target output data.

In certain example embodiments, a method for transforming signal data using a neural network is provided. The method includes populating an initial activation matrix with a plurality of values that are based on data from a plurality of samples from a source signal. Separable block transforms are then applied over multiple layers of the neural network. The separable block transforms are based on at least one learned matrix of coefficients and are applied to an input activation matrix to generate a corresponding output activation matrix. The initial activation matrix is used as the input activation matrix for a first layer of the multiple layers and the input activation matrix for each successive layer is the output activation matrix of a prior layer. The method further includes outputting the output activation matrix of the last layer of the neural network to generate a transformed signal that is based on the output activation matrix of the last layer.

In certain example embodiments, the method operates such that at least two of the rows or columns of the initial activation matrix correspond to superposable data from each of the plurality of samples.

In certain example embodiments, a distributed computer game system is provided. The system includes a display device configured to output images (e.g., of a video game or another application) at a target resolution. The system includes a cloud-based computer system that includes multiple processing nodes. The processing nodes of the cloud system are configured to execute a first video game thereon and generate images for the first video game at a first resolution. The processing nodes of the cloud system are configured to transmit image data that is based on the generated images. The system also includes a client computing device configured to receive the image data. The client computing device includes at least one hardware processor and is configured to execute a neural network based on the received image data to generate a target image.

The execution of the neural network on the client device applies separable block transforms to a plurality of activation matrices that each correspond to different blocks of pixel data within the image that is represented by the image data. The target image is generated at the target resolution and output, at the target resolution to the display device for display thereon during gameplay of the first video game.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional elements, techniques, protocols, etc. in order to provide an understanding of the described technology. It will be apparent to one skilled in the art that other embodiments may be practiced apart from the specific details and examples described below. In certain instances, detailed descriptions of well-known methods, systems, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Figure 1:
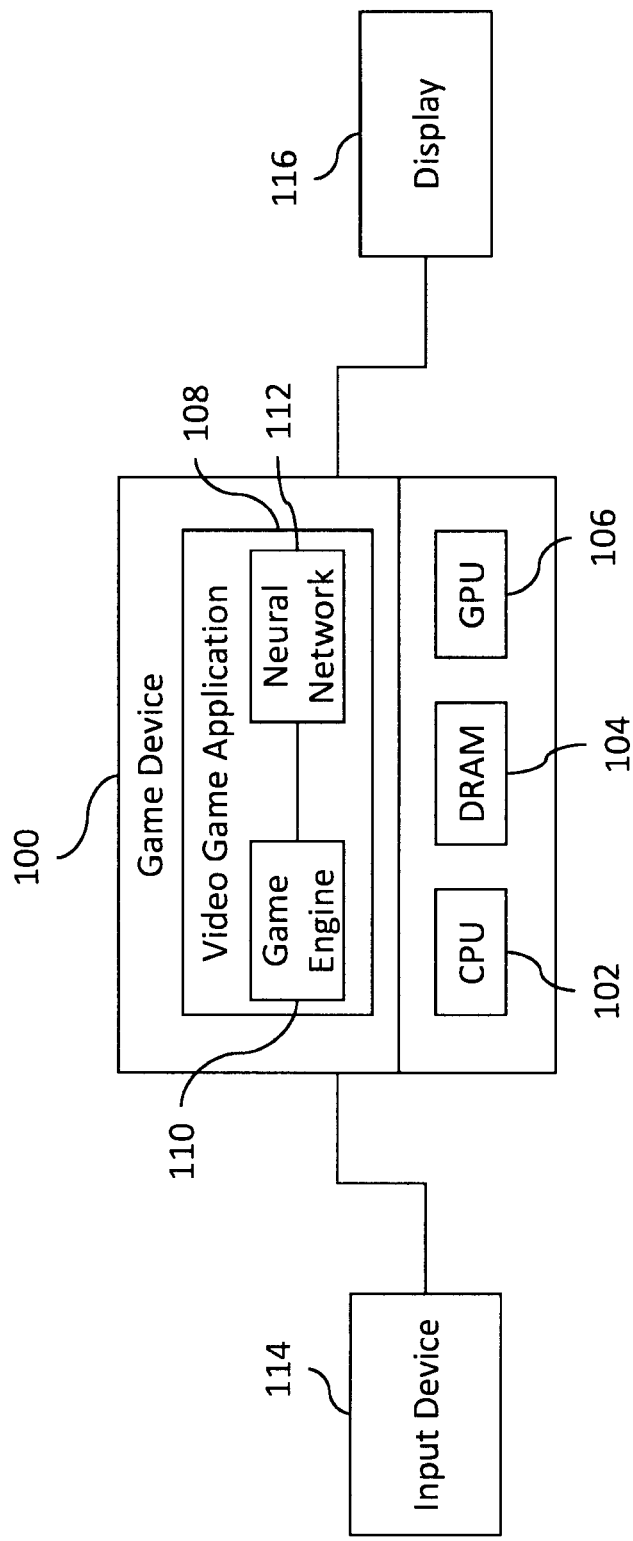
FIG. 1 is a block diagram that includes an example computer system according to certain example embodiments.
Figure 10:
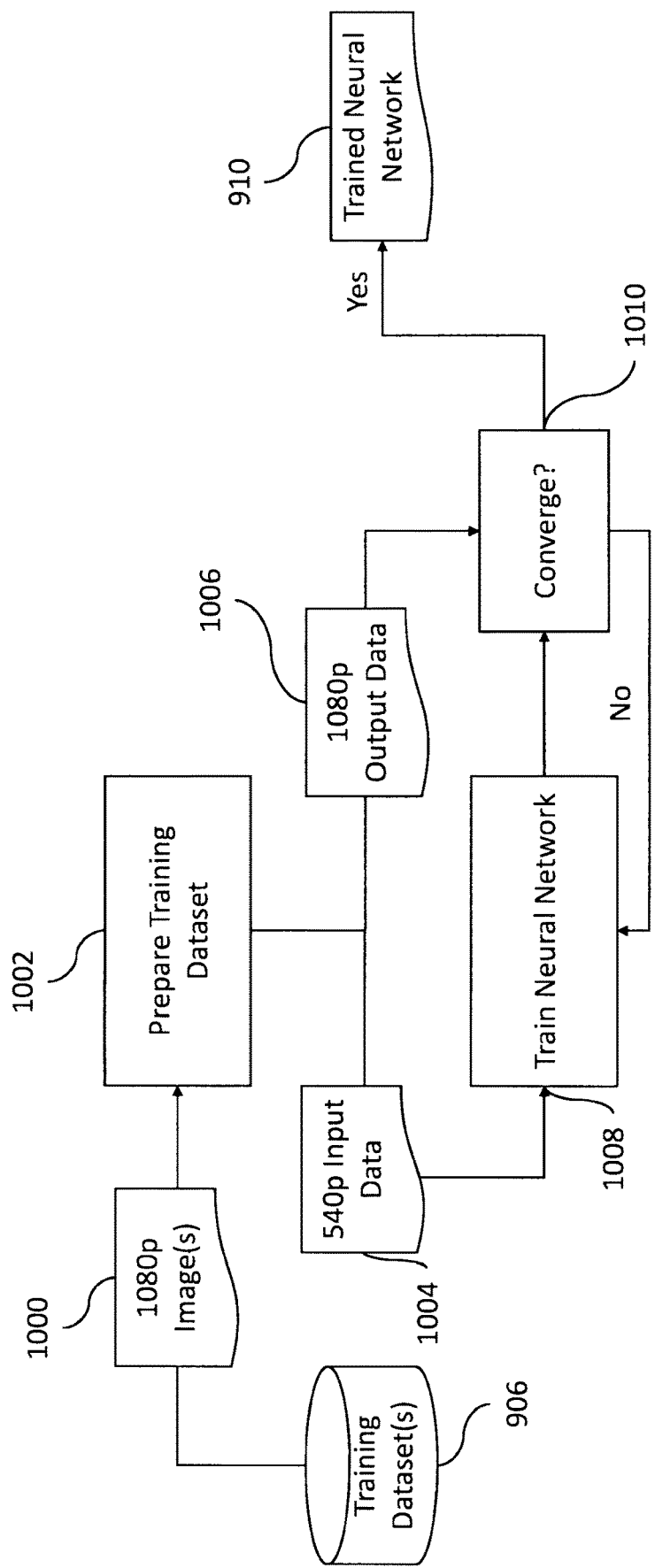
FIG. 10 is a flow chart showing a process for training a neural network that may be used in connection with certain example embodiments, including the process shown in FIG. 2.

In many places in this document, including but not limited to the description of FIGS. 1 and 10, software modules, software components, software engines, and/or actions performed by such elements are described. This is done for ease of description; and it should be understood that, whenever it is described in this document that a software module or the like performs any action, the action is in actuality performed by underlying hardware elements (such as a processor, hardware circuit, and/or a memory device) according to the instructions that comprise the software module or the like. Further details regarding this are provided below in, among other places, the description of FIG. 13.

Overview

Certain example techniques herein relate to transforming an input signal (e.g., a digital signal) into an output signal through use of neural networks. Examples of different types of signals may be images, audio, or other data that may be sampled or otherwise divided so as to be transformed into a transformed signal according to certain example embodiments discussed herein.

Figure 8A:
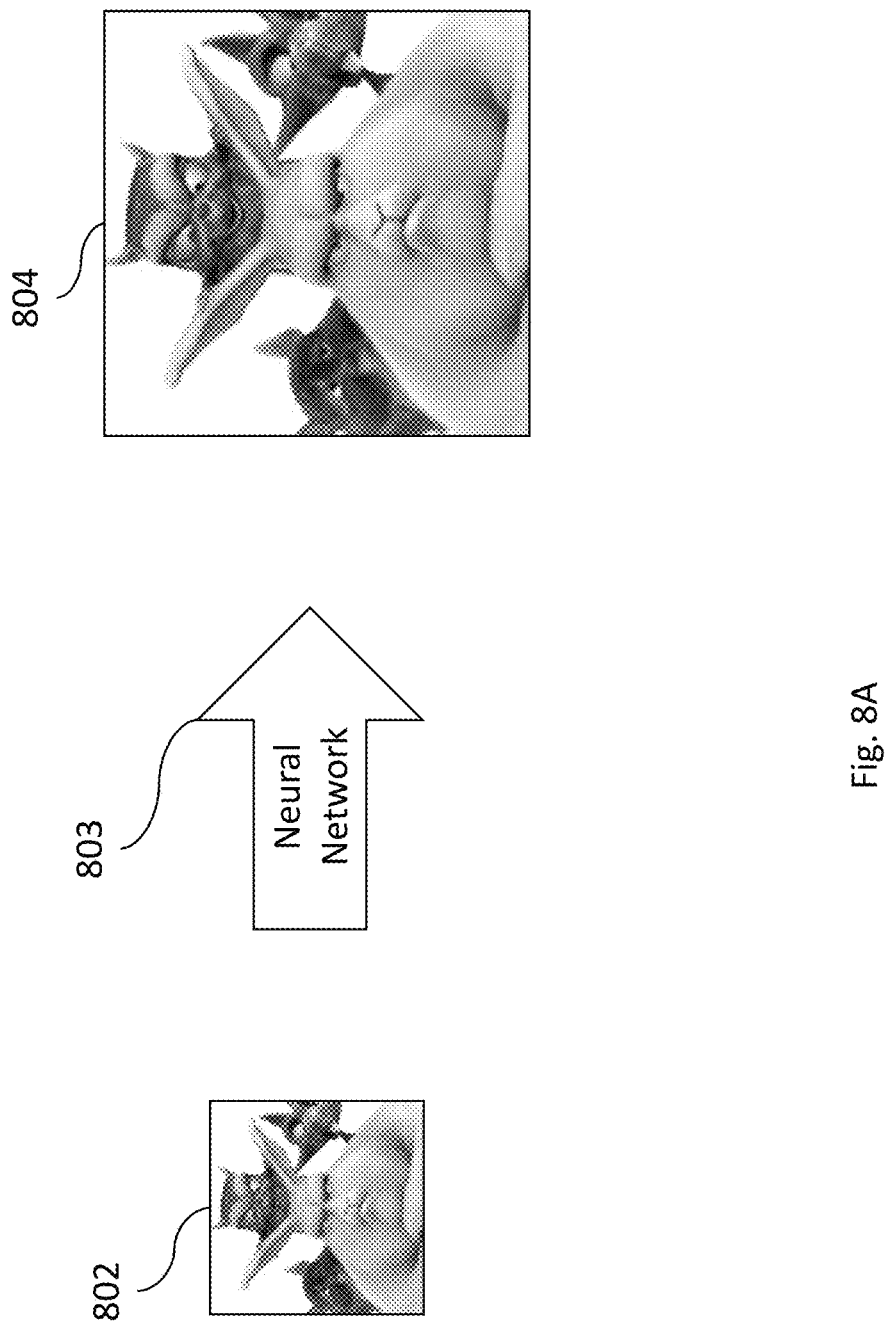
FIG. 8A includes an example source image, in color, and a corresponding transformed image, also in color, that has been generated according to the techniques describe in connection with FIGS. 1 and 2.
Figure 8B:
FIG. 8B includes two images, in color, that are zoomed versions of the images shown in FIG. 8A.
Figure 8B:
Figure 8C:
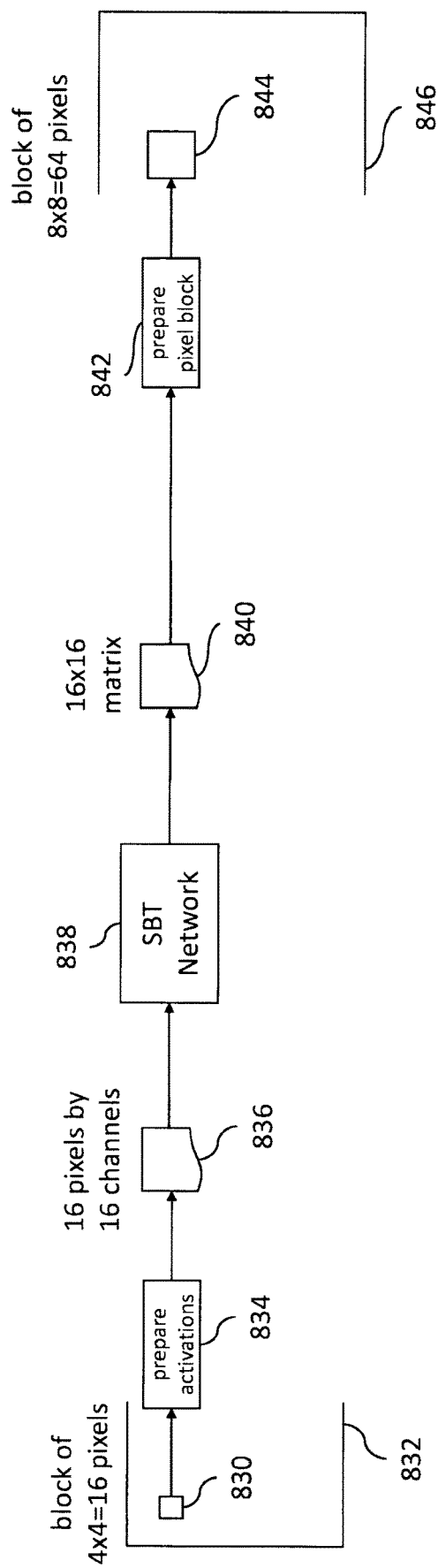
FIGS. 8C-8E are block diagrams showing different SBT architectures according to certain example embodiments.
Figure 8D:
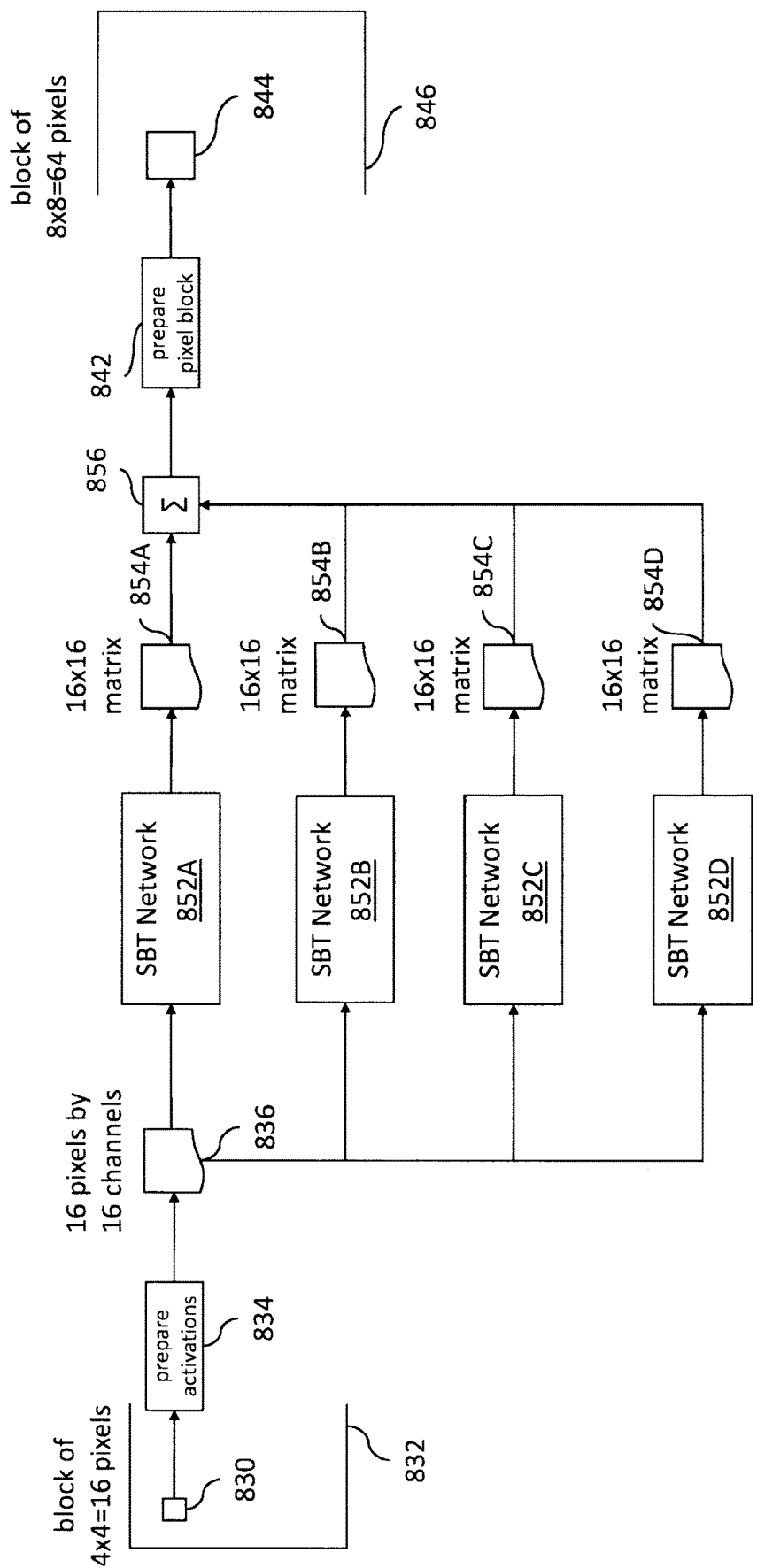
Figure 8E:
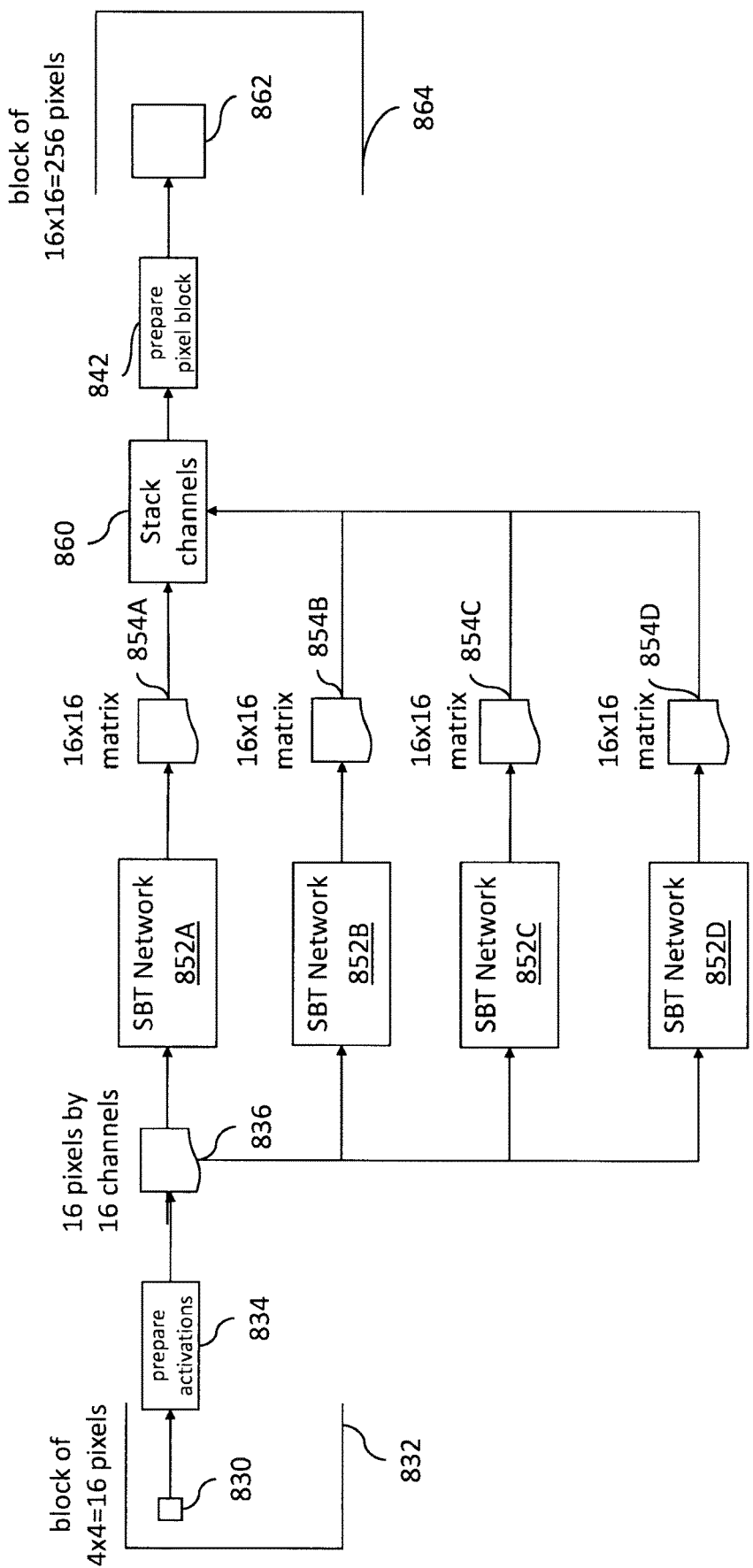
Figure 9:
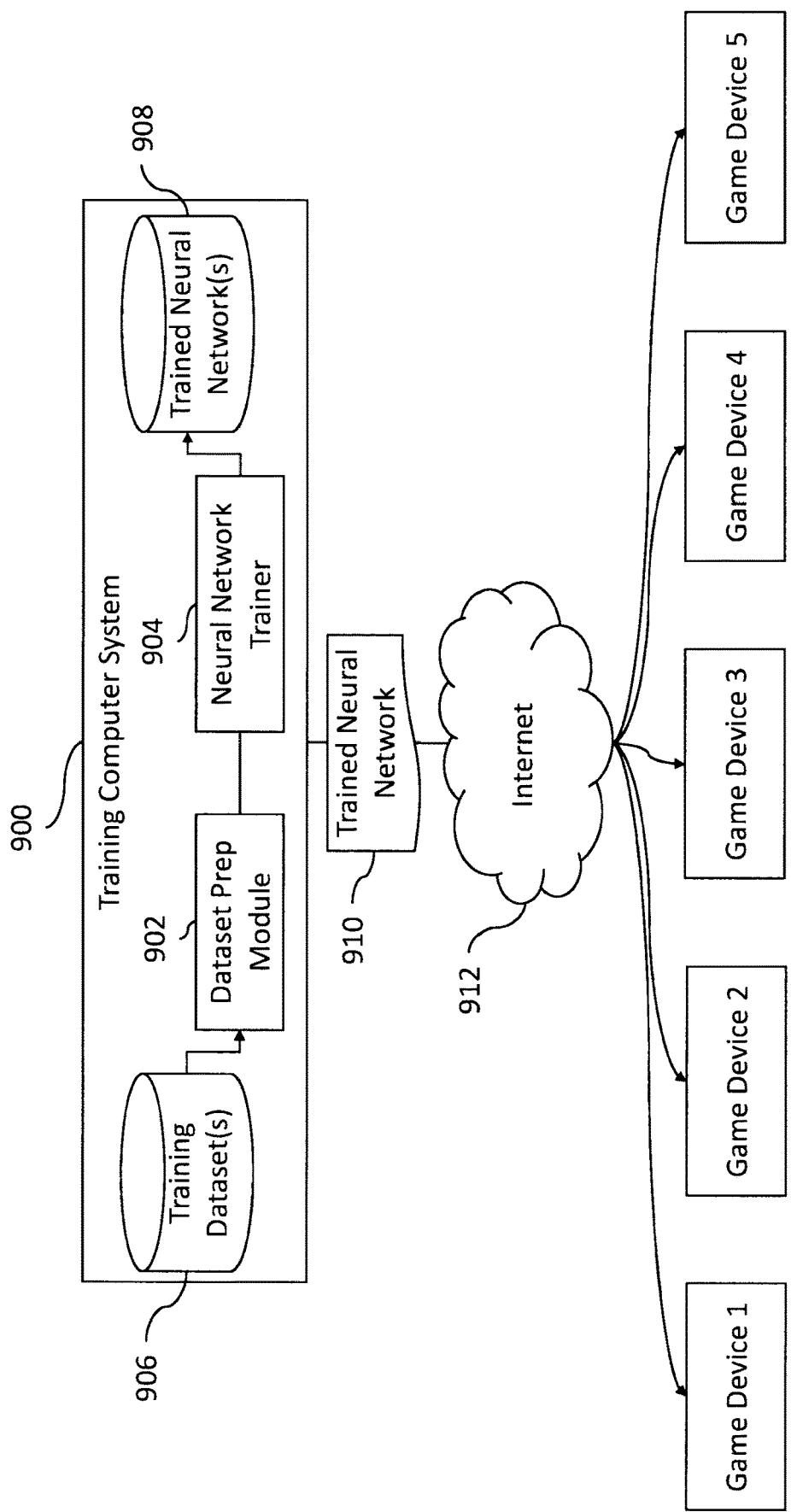
FIG. 9 is a block diagram that includes an example training computer system according to certain example embodiments.
Figure 11:
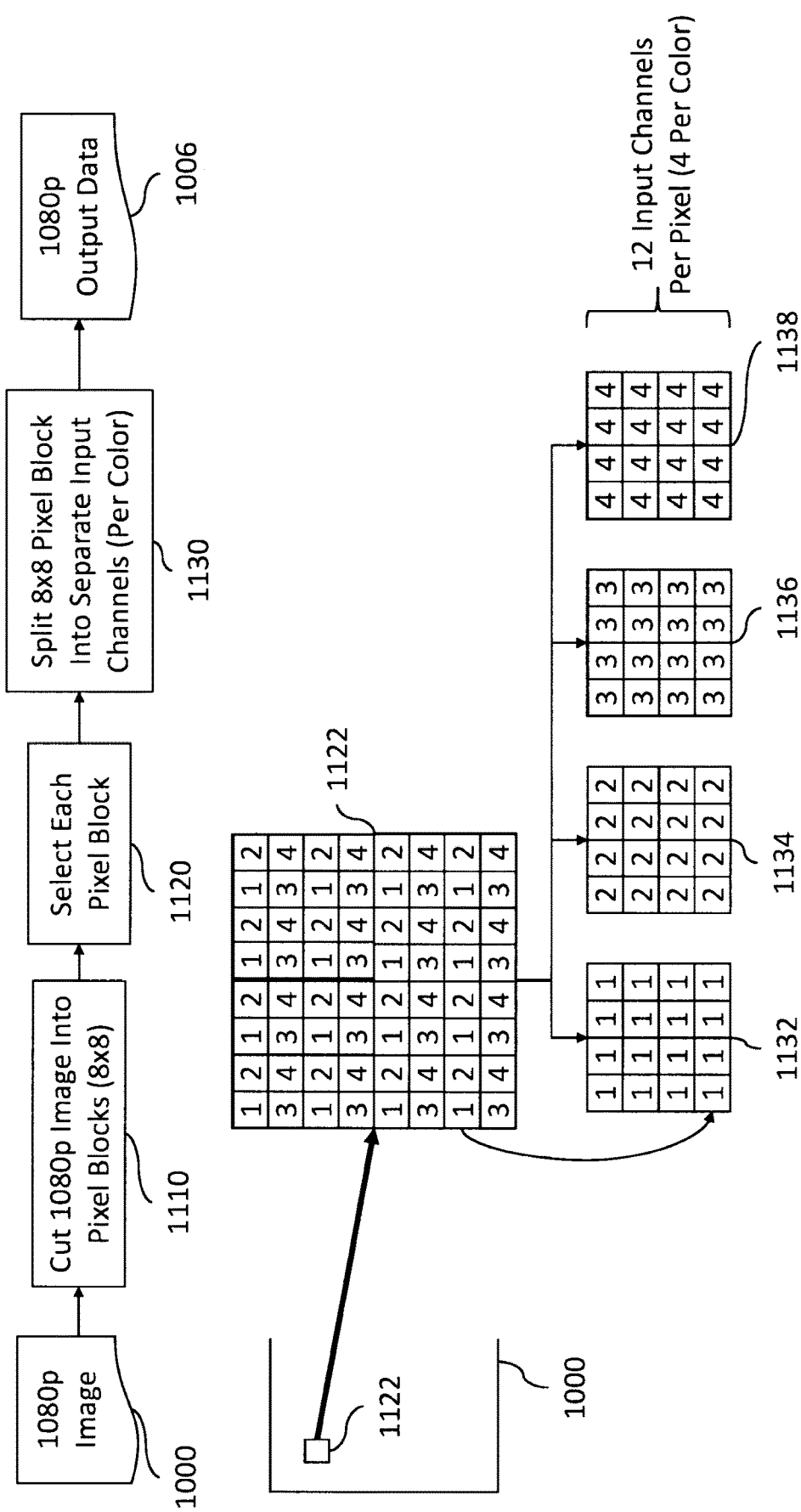
FIG. 11 is a flow chart showing an expanded view of how 1080p image data is prepared as part of the neural network training process that is shown in FIG. 10.
Figure 12:
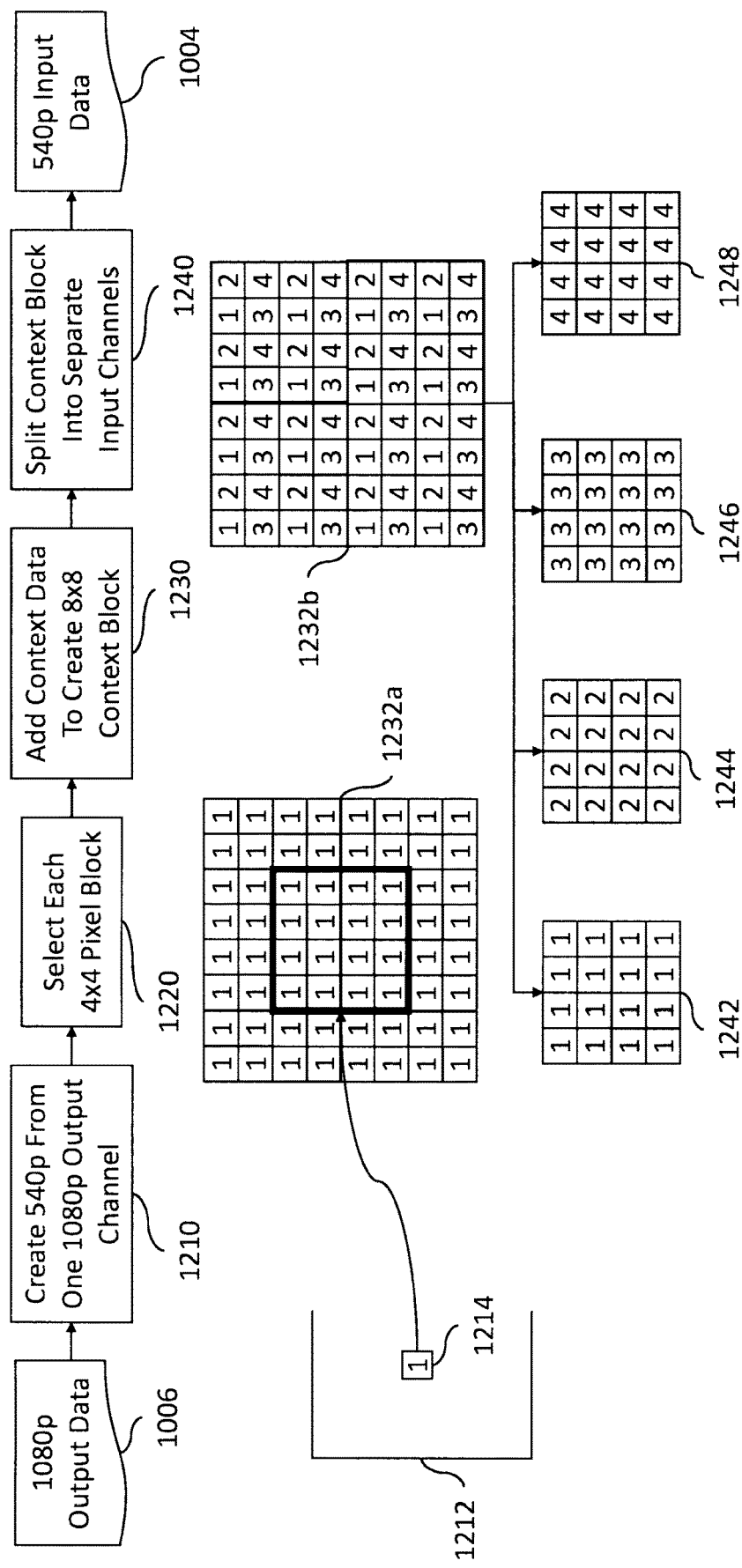
FIG. 12 is a flow chart showing an expanded view of how 540p image data is prepared as part of the neural network training process that is shown in FIG. 10.
Figure 13:
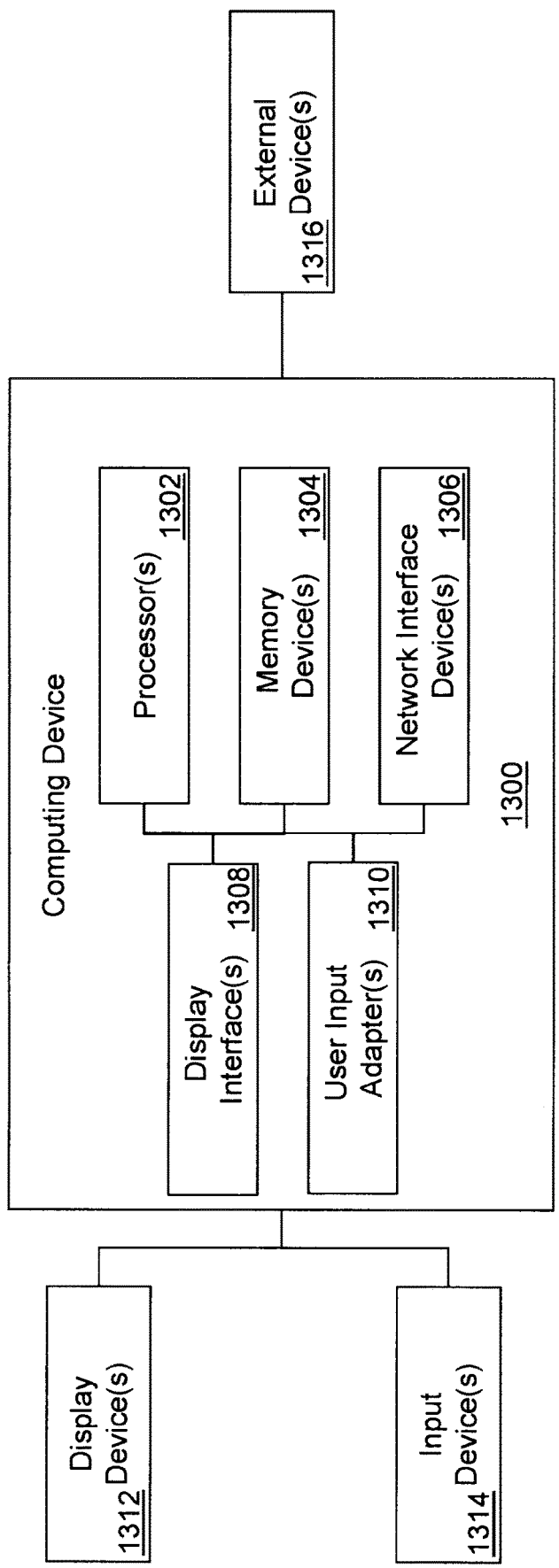
FIG. 13 shows an example computing device that may be used in some embodiments to implement features described herein.

FIG. 1 shows a block diagram of an example computer system (e.g., a video game system) that may be used by a user to play a video game. The system is configured to implement the process shown in FIG. 2 that allows for the images that are generated by a game engine in a first resolution (e.g., 540p) to be upconverted to a different resolution (e.g., 1080p). FIGS. 3-7 illustrate different aspects of the process shown in FIG. 2. FIGS. 8A and 8B show non-limiting examples in accordance with the techniques discussed in FIG. 2. FIGS. 8C-8E are block diagrams showing different SBT architectures according to certain example embodiments. FIG. 9 shows a block diagram with a computer system used to train a neural network that may be used by the process shown in FIG. 2. FIG. 10 is an example process that may be executed on the computer system in FIG. 9 to generate a trained neural network. FIGS. 11-12 are further detailed aspects of the process shown in FIG. 10. FIG. 13 is a block diagram of an example computer system that may be used in FIGS. 1 and/or 9 and/or to implement or execute the processes shown in FIGS. 2 and/or 10.

Description of FIG. 1

FIG. 1 is a block diagram that includes an example computer system according to certain example embodiments.

Game device 100 is an example of the computer system 1300 shown in FIG. 13. While the term "game" device is used in connection with certain example embodiments herein, this is done for ease of use and any type of computing device may be used. Indeed, a "game" device as used herein may be a computing device (e.g., a mobile phone, tablet, home computer, etc.) that is being used (or will be used) to play a video game at that time. A non-limiting illustrative list of computing devices may include, for example, a smart or mobile device (e.g., a smart phone), a tablet computer, a laptop computer, a desktop computer, a home console system, a video game console system, a home media system, and other computer device types. As explained in connection with FIG. 13, computers can come in different sizes, shapes, functionality and the like. In certain example embodiments, the techniques discussed herein can be used in conjunction with non-game applications. For example, they may be used in conjunction with real-time video surveillance, web browsing, speech recognition, or other applications where transforming one dataset into another may be of use. Additional examples and applications for the techniques herein as discussed below.

Game devices 100 may include a CPU 102, a GPU 106, and DRAM (dynamic random-access memory) 104. CPU 102 and GPU 106 are examples of processor 1302 from FIG. 13. DRAM 104 is an example of memory devices 1304 from FIG. 13. Different types of CPUs, GPUs, DSPs, dedicated hardware accelerators (e.g., ASICs), FPGAs and memory technology (both volatile and non-volatile) may be employed on game device 100.

Examples of different types of CPUs include an Intel CPU architecture (e.g., x86) and an ARM (Advanced Risk Machine) architecture. Examples of different GPUs include discrete GPUs like the NVIDIA V100 (which may include hardware support for matrix multiplications or tensor cores/accelerators) and integrated GPUs that may be found on a system on a chip (SoC). SoCs may combine two or more of the CPU 102, GPU 106 and local memory like registers, shared memory or cache memory (also called static RAM or SRAM) onto a single chip. DRAM 104 (also called dynamic RAM) is usually produced as a separate piece of semiconductor and connected to the SoC through wires. For example, the NVIDIA Tegra X1 SoC includes multiple CPUs, a GPU, Northbridge controller, Southbridge controller, and a memory controller all onto a single SoC. In certain examples, the processing capabilities provided by the CPU, memory components, GPU, and/or other hardware components that make up a given game device may be different on other game devices. Some game devices may be mobile, some may be stationary game consoles, or operate as personal computers (e.g., a desktop or laptop computer system that is used to play video games).

GPUs may include many processing cores that operate in parallel. Each processing core that is part of the GPU may operate along with corresponding hardware registers that store data therein that are used by the various processing cores. For example, the GPU architecture from NVIDIA includes many 32 bit, 16 bit, and/or 8 bit registers that provide data to the processing cores of the GPU. In certain GPU architectures the highest bandwidth memory may be available in registers, followed by shared memory, then cache memory, then DRAM. As discussed in greater detail below, the data regarding the datasets that are to be converted (e.g., images to be upconverted) may be efficiently loaded into these registers to allow for increased efficiency in converting the datasets to another from (e.g., another resolution). Indeed, making use of the hardware registers on the GPU for this operation may allow for an example upconverting process to be performed in real-time (e.g., less than 1 second, less than $\frac{1}{30}^{th}$ of a second, or less than $\frac{1}{60}^{th}$ of a second) and/or during runtime of an application or game (e.g., without noticeable delay) without needing to change how the initial image is generated at the lower resolution.

In certain example embodiments, the techniques herein may advantageously take advantage of NVIDIA's tensor cores (or other similar hardware). A tensor core may be a hardware unit that multiplies two 16×16 FP16 matrices (or other sized matrices depending on the nature of the hardware), and then adds a third FP16 matrix to the result by using fused multiply—add operations, and obtains an FP16 result. In certain example embodiments, a tensor core (or other processing hardware) can be used to multiply two 16×16 INT8 matrices (or other sized matrices depending on the nature of the hardware), and then add a third INT32 matrix to the result by using fused multiply-add operations and obtain an INT32 result which can then be converted to INT8 by dividing by the appropriate normalization amount (e.g., which may be calculated during a training process, such as described in connection with FIG. 9). Such conversions may be accomplished using, for example, a low processing cost integer right shift. Such hardware acceleration for the processing discussed herein (e.g., in the context the separable block transforms) may be advantageous.

Returning to FIG. 1, game device 100 may also be coupled to input device 114 and display device 116. Examples of input device 114 include video game controllers, keyboards, mice, touch panels, sensors and other components that may provide input that is used by the computer system (e.g., game device) to execute application programs and/or video games that are provided thereon.

Examples of display device 116 include a television, a monitor, an integrated display device (e.g., that is part of a mobile phone or tablet), and the like. In certain examples, game device 100 may be configured to couple to different types of display devices. For example, game device 100 may be coupled to an integrated display (e.g., that is part of the structural body that houses game device 100) on which images may be output. Game device 100 may also be configured to output images to a larger television or other display. In certain example embodiments, the different display devices may natively display different resolutions. For example, the integrated display of a game device may have 0.5 million pixels (e.g., a 540p display) and the separate display may have 2.1 million pixels (e.g., a 1080p display). Using the techniques herein, the game device 100 may be configured to output different images for a game depending on what display device is the target for the game device. Thus, for example, 540p images will be output to the integrated display when the integrated display is used and 1080p images may be output to the 1080p display when it is used.

In certain example embodiments, a computer system may dynamically switch between the type of images that are being output based on the conditions associated with the computer system. Such switching may occur while a game is being played by a user (with perhaps a brief pause while the switch between the two modes occurs). For example, if the computer system is running on battery (e.g., is not plugged in to a socket), then the computer system may be configured to not use an example image conversion process that uses the techniques discussed herein. However, if the computer system is plugged into an AC power supply, then the techniques discussed herein for upconverting images to a higher resolution may be used or turned on for a video game or other application. This is because the techniques discussed herein may increase the power consumption of the GPU due to using a greater percentage of the processing power that is available to the GPU being used (e.g. up to 80, 90, or 95% or greater). Thus, if the computer system were to run solely off the battery of the mobile device while using, for example, the process shown in FIG. 2, it may more quickly deplete the battery. Such techniques may thus allow a user to play a game on a mobile device as they are, for example, commuting home from work. In this mode the user would use the local display on the device (e.g., 540p) for the video game. However, when the user gets home they may plug the mobile device into a socket so that it is no longer relying on its own battery power. Similarly, the user may couple the mobile device to a larger display (like a television) that is a 1080p display. Such a connection may be wired (e.g., an DisplayPort or HDMI cable) or wireless (e.g., Bluetooth or WiFi). Upon detecting one (or both) of these scenarios (e.g., the target display being able to display a higher resolution and/or a non-battery power supply for the computing system), the system may dynamically start the image conversion process that is discussed with respect to FIG. 2 to allow a user to play the game on their 1080p television and see the game in a higher resolution. In certain example embodiments, the user may manually start the process of image upconversion as well.

The techniques herein may advantageously provide for performance that is less bound by memory bandwidth limitations than prior approaches. In other words, the architecture for converting images (or, more generally, datasets) that is discussed herein may not be limited by memory bandwidth bottlenecks. This may hold especially true for real-time inference which typically may be limited to batches of 1 (e.g., instead of a typical training scenario which generally benefits from bigger batches like 256). In other words, the techniques herein may allow for nearly 100% of utilization of matrix multiplication hardware accelerators during run-time of an application (e.g., a video game) and thus may increase (e.g., maximize) an overall performance per dollar that is spent on the hardware that is used for the transformations.

Returning to FIG. 1, game device 100 stores and executes a video game application program 108. Included in the video game application program are a game engine 110 and a neural network 112. The game device 100 may also store image data (e.g., textures) and other types of assets (e.g., sound, text, pre-rendered videos, etc.) that are used by the video game application program 108 and/or game engine 110 to produce or generate content for the video game (or other application) such as, for example, images for the game. Such assets may be included with a video game application program on a CD, DVD, or other physical media, or may be downloaded via a network (e.g., the Internet) as part of, for example, a download package for the video game application program 108.

The game engine 110 includes program structure for generating images that are to be output to the display 116. For example, the game engine 110 may include program structure for managing and updating the position of an object(s) in a virtual space based on inputs provided from the input device 114. The provided data is the used to render an image of the virtual space by using, for example, a virtual camera. This image may be a source image that is generated in a first resolution (e.g., 540p). The source image is applied to the neural network 112 that converts the source image into an upconverted image (e.g., an upconverted image is generated based on application of the source image to the neural network 112) that is at a higher resolution (e.g., 1080p) than the original source image. That upconverted image is then output to the display device 116 for display thereon. Further description of how the neural network is generated is provided in connection with FIG. 9.

In certain example embodiments, the time it takes to upconvert the source image (e.g., produced by the game engine 110) is less than $\frac{1}{60}^{th}$ of a second. Thus, if the game engine is producing images at 60 times per second, which are intended to be displayed on display 116, then there may be little to no noticeable graphical delay in outputting the upconverted image to the display instead of the source image. Such techniques may thus allow for generating and displaying upconverted images from original source images in real time. For example, if a video game application is developed to produce images in a first resolution (e.g., 540p), the techniques herein may allow for graphically upgrading that video game application so that images may be output from the video game application at a higher resolution (e.g., 1080p) than originally intended.

It will be appreciated that while a video game application program 108 is used for the purposes of description, other applications that provide video output could be substituted. As well, while the neural network 112 is shown as being part of a video game application program 108, it may be separately provided. For example, it may be part of an operating system service or the like that modifies or upconverts images as they are being output by a video game application program.

In certain example embodiments, the "game device" may be a device that is hosted within a cloud-based environment (e.g., on Amazon's AWS or Microsoft's Azure system). In such a scenario, the game (or other application program) may be hosted on a virtual machine in the cloud computer system and the input devices and display devices may be local the user. The user may also have a "thin" client application or computer that is communicating with the cloud-based service (e.g., communicate data from the device and receive and display images that are received from the cloud to the television). In this type of implementation, user input is passed form the user's computer/input device to the cloud-based computer system that is executing the video game application 108. Images are generated by the game engine, transformed by the neural network (e.g., upconverted) and then transmitted to the user's display (or a computer that then outputs the images to the display).

In certain example embodiments, a cloud-based system may take advantage of the upscaling ability on the "thin" client by rendering, compressing and streaming to the client a compressed low resolution (e.g., 540p) video/image at a lower server cost (and bandwidth), and letting the client hardware implement the upscaling (e.g., neural network processing 112). In certain examples, this may also include having the neural network address or compensate for compression artifacts. Accordingly, the features herein may advantageously decrease bandwidth usage in certain cloud-based game environments.

In certain example embodiments, a cloud-based system may operate dynamically with respect to the target display that is being used by a user. Thus, for example, a video game may natively output images in 540p. A first user may use the cloud system to receive images that are at 1080p (e.g., upconverted from 540p) and a second user may use the cloud system to receive a different resolution image (e.g., a 720p image, 4k image, or a 1440p image). Each instance of the video game application (and/or neural network) may be hosted within its own virtual machine or virtual container and thus allow for flexibly providing multiple different users with different options (e.g., outputting different resolution images) to "play" the same video game.

A cloud-based implementation may be useful in contexts where the user does have access to a GPU that is capable of executing the techniques discussed herein.

In certain example embodiments, the GPU may instead be (or include) an ASIC or FPGA that operates in a manner similar to the GPU.

In certain example embodiments, game device 100 may be two or more computer systems.

It will also be appreciated that the type of "application" or program or data source that is providing the source image is not confined to video games. Indeed, other types of applications may also make use of the techniques herein including real-time image recognition from a wildlife cam, audio, translation of words/sentences, images provided from a home security camera, movies and other TV programs, and the like.

For more general applications like image classification for example, implementation of a traditional CNN on GPU processing hardware may involve: 1) loading layer weights in fast memory (e.g., registers or shared memory of the GPU); 2) loading the layer inputs from DRAM to registers; 3) multiplying inputs with weights using matrix multiplication implemented on the GPU; 4) applying a non-linear function; 5) storing the layer outputs to DRAM; and 6) repeating this process for each layer. A downside of this approach is that the back and forth movements to and from DRAM. For example, layer data (e.g., activations) usually cannot entirely fit into the relatively limited amounts of fast memory (such as registers) that are used in connection with the processing of the layers of a neural network. Accordingly, that data may need to be transferred between different memory locations in certain instances because layer data (e.g., the activations, which may be a matrix of 960×540×16 values, which corresponds to the resolution of a 540p source image, combined with 16 channels in an example) may not fit into the registers (or other "fast" memory) of the GPU. Accordingly, main memory (DRAM 104) may be used to store such information.

In certain example embodiments, fusing different layers (e.g., "layer fusion") may be used such that calculations from one layer and the next layer can be implemented through a single processing code (e.g., a CUDA kernel). A potential downside to this approach is that since CNNs are translation invariant, they may suffer from the fact that as more layers are fused, the larger the number of inputs are required to calculate a single output value. Thus, while this type of implementation may provide a valuable benefit by increasing the receptive field (the ability of the end values of the neural network to "see"/depend on a wide range of inputs), it may also come with a performance drawback.

In certain example embodiments, the approach to how the data may be prepared to be processed may be based on the nature of the underlying hardware that will be performing the operations (e.g., matrix operations). In certain example embodiments, the images are split into blocks, the size of which may be based on the underlying hardware. Certain example embodiments, may be implemented on NVidia GPUs hardware (e.g., Volta and Turning architectures) where the CUDA API exposes hardware acceleration for 16×16 matrix multiplications. Due to this (and as discussed below), block sizes of 4×4 may be used (those 16 pixels being mapped to a row of a 16×16 matrix) within an image that is to be transformed. With such an implementation, the inputs could be split into 16 inputs with 16 channels (as discussed below less than 16 channels may be used in certain examples), thus fitting into an atomic 16×16 matrix—which may then be stored within registers of a GPU (or other "fast memory" that will be handling the matrix math). Naturally, the size of the atomic matrix may be designed differently depending on the nature of the dimensions for the fastest atomic multiplication hardware that is usable by GPU 106 (or even CPU 102 if it is designed as such) for an example block-based neural network architecture for a specific size.

As the matrix remains in the registers, the layers for a given pixel (or other type of data from a signal) may be "fused" together as they remain in the registers during the processing. This is discussed in more detail in connection with FIG. 2 below. In certain example embodiments, the activation matrices may remain within internal memory the hardware (e.g., a GPU, CPU, DSP, FPGA, ASIC, etc.) that is performing the matrix operations on the activation matrices. In other words, data for a given activation matrix may remain within the same semi-conductor hardware (which may be the same silicon for silicon based memory or other material, such as gallium, germanium, etc. for other memory types) while the various layers of a neural network are applied to that activation matrix—e.g., successively transforming the activation matrix over the multiple layers of the neural network.

Based on such blocks, a general transform of a layer using a block matrix (with each of the blocks W being a generic p×p matrix) may be present as follows:

$$\begin{bmatrix} W & & 0 \\ & \ddots & \\ 0 & & W \end{bmatrix} \begin{pmatrix} a_0 \\ a_1 \\ \vdots \\ a_n \end{pmatrix}$$

It will be appreciated that with such a block-matrix design, the insulation of each block may prevent propagation of the receptive field that would other occur (e.g., in the case of an ordinary CNN). Thus, the techniques herein may allow for fusing many layers (e.g., as many as desirable) while still maintaining locality of data in question. As the width of the data remains somewhat constant between input and output of each layer, such fused layers may be termed a "Block Tower."

From an inference perspective, this type of approach may be favorable because it can be implemented as a series of atomic size matrix multiplications as follows:

$$\begin{bmatrix} W & & 0 \\ & \ddots & \\ 0 & & W \end{bmatrix} \times \begin{bmatrix} W' & & 0 \\ & \ddots & \\ 0 & & W' \end{bmatrix} = \begin{bmatrix} W'' & & 0 \\ & \ddots & \\ 0 & & W'' \end{bmatrix}$$

One potential issue is maintaining data in such a localized manner may prevent the system from benefiting from a wider receptive field (which may be beneficial in certain classification applications). Such issues may be at least partly addressed by introducing "block-convolutional" and "block-pooling" layers in certain examples. For instance:

$$\begin{bmatrix} W_0 & W_1 & & 0 \\ W_2 & & & \\ & \ddots & & \\ 0 & & & W_1 \\ & & W_2 & W_0 \end{bmatrix}$$

With $W_i$ being p×p matrices (with p=16 in a typical example). With such a formulation, this may be similar to a traditional CNN matrix formulation, but with the individual CNN filter weights (e.g., single real floating point numbers) being replaced by block matrices. Or to put it another way, the block techniques discussed herein may be viewed as a generalization of CNNs, because if block matrices of a 1×1 dimension are used, then the technique can fallback to a more traditional CNN formulation.

In certain example embodiments, the input signal (e.g., which may be an image) may be treated by separable block transforms (or block-convolutional SBTs) in a "translation invariant manner". Accordingly, in the context of images, if a signal S (e.g., a first image) is translated by 4 pixels horizontally or 4 pixels vertically into a signal S' (e.g., a second image), then the generated 4×4 blocks of signals S and S' (which correspond to the activation matrices used as inputs for SBT networks) will, most of the time, coincide (excepting the borders of the respective images). If the blocks of S and S' are the identical (again excepting the borders of the signal), then the output blocks that are generated by applying S and S' through the SBT will be the same. In other words, the transformed signal will also be the same with just a translation difference between SBT(S) and SBT(S'). Another way to view this is that SBTs (and/or also block-convolutional SBTs) are calculated on a first block, then are calculated again with the same weights (same learned L and R matrices) on the neighbor block, then again on the neighbor block, etc. Accordingly, the signal is processed in a "convolutional manner" by applying the same calculation while moving the input position (e.g., translating) along the input signal.

The block towers may be compared to separable transforms used in the context of CNNs (e.g., from MobileNet as discussed in connection with A. G. Howard et al., "Mobile-Nets: Efficient Convolutional Neural Networks for Mobile Vision Applications," the entire contents of which are hereby incorporated by reference), with the linear part of the transform expressed as X→LXR (with L, X and R being p×p matrices), which may also be denoted as L⊗R.

This may also be termed the tensor product and whose (block) matrix is called the Kronecker produce of L and R:

$$L = \begin{bmatrix} l_{11} & \cdots & l_{p1} \\ \vdots & \ddots & \vdots \\ l_{1p} & \cdots & l_{pp} \end{bmatrix}, R \begin{bmatrix} r_{11} & \cdots & r_{p1} \\ \vdots & \ddots & \vdots \\ r_{1p} & \cdots & r_{pp} \end{bmatrix},$$

$$L \otimes R = \begin{bmatrix} l_{11}R & \cdots & l_{p1}R \\ \vdots & \ddots & \vdots \\ l_{1p}R & \cdots & l_{pp}R \end{bmatrix}$$

The left matrix L of dimensions p×p (e.g., point-wise transform in MobileNet) processes all the channels of a given data point, in the same way for each data point. It is of general form, meaning that all of its coefficients can be learned fully independently.

The right matrix R of dimensions p×p (e.g., a depth-wise convolutional transform in MobileNet) processes all the pixels of a given channel, in the same way for each channel. It is of general form, meaning that all of its coefficients can be learned fully independently.

The above formulation is symmetric and balanced and may be applied generally in several different instances. The form may also be further modified to handle rectangular matrices (e.g., of size p×q) on both the L and R sides. In other words, the input dimensions of the layer may match with the output dimensions of the previous layer. It will be appreciated, however, that having the values of p and q be multiples of the atomic accelerated hardware matrix multiplication size may provide for increased/efficient use of hardware resources and may, in certain examples, be optimal in terms of speed.

The block shape and the invariance between data points may advantageously be used to process them together in a single matrix multiplication. Thus providing for efficient use of resources in certain example embodiments.

It will be appreciated that a 3×3 convolution kernels may be implemented by adding 9 point wise 1×1 kernels. Thus, the above discussed separate transform can also be summed as follows:

$$X \rightarrow \sum_{i=1}^{n} L^i X R^i$$

With this formulation, a family of up to $p^2 L^i \otimes R^i$ separable block transforms can be built and added without redundancy. Having the ability to sum separable transforms up to $p^2$ times shows that an example separable model can be both general and expressive. When looking at the rank of the matrix calculated as the sum of the Kronecker products of $L^i \otimes R^i$, we can observe that if $L^i$ and $R^i$ coefficients are picked randomly (and thus are linearly independent), the rank of the resulting $p^2 * p^2$ matrix grows by $p^2$ for each additional sum element until reaching $p^4$. Accordingly, sums of separable block transforms may be viewed as an intermediate between a separable transform and a fully connected transform, which may be further tailored for how close to a separable transform or how close to a fully connected transform a particular application needs to be. It is usually presented as a low-rank decomposition in the sense that a fully-connected transform would be of maximal rank $p^4$ which may be represented with $p^2$ LXR terms. However, using fewer terms in the sum make it possible to replace the fully-connected layer by a lower ranked transform, with a lower cost in terms of weights and thus storage, training, and/or inference time.

A potential added benefit of the sum approach can be the performance of the implementation of the inference. In the case where the format of the input matrix and the output matrix of an LXR product are the same (for example 16×16 FP16 values), the code implementing the inference may be strictly limited to matrix multiplications (e.g., with fused multiply and add) executed one after another. This type of approach may advantageously allow for operations to be performed without the need to marshal data around, reorganize such data in other forms, or convert the data to other formats. This type of approach may also advantageously avoid adding or using unnecessary instructions because the data is already in the right format for each part of the sum. In certain examples, the number of LXR sums can be set as a dynamic parameter as the format of the input and output of the sum doesn't change (e.g., it may be assumed to be a 16×16 matrix, such as discussed in connection with the examples herein). This may thus be a way to freely increase the weights and thus the ability to learn/memorize more things while ensuring that the time required for loading the weights remain hidden behind the time it takes to do the matrix multiplications (e.g., which depends on each specific hardware memory bandwidth and matrix multiplication speed).

For training, the added flexibility can be applied to train an oversized network that may then be compressed by pruning the least necessary elements of each sum while keeping only the "winning ticket"/most relevant aspects obtained at the "lottery" of matrix initializations. This dynamic process may help decide, on a content by content basis for each training, how many multiplications are allocated at each layer under a given budget of processing time. Such a determination may be based on knowing a simple model of inference time—which is linear in the number of matrix multiplications. Such aspects may then be combined for deciding the number of layers—(which may be no more than a dozen or so and is usually not a particularly large latent search space).

In certain example embodiments, a larger number of channels may be employed where several of the separable block towers that are discussed herein may be calculated in parallel from the same input values (e.g., activation matrices) but with different learned weights (L and R matrices). Such an approach may be similar in certain respects to grouped channels in Convolutional Neural Networks.

In certain example embodiments, to avoid maintaining the channels of each tower isolated from the others until the end of the network, the output of all block towers can be stored together (e.g., in memory, such as DRAM or cache, for example) and be used together as inputs of another group of separable block towers. Such an implementation may additionally decrease the reliance on DRAM bandwidth (e.g., as data is more quickly accessed through cache memory) compared to an equivalent convolutional neural network architecture. Stated another way, a p*p SBT can use more than p*p activations as inputs by fusing several p*p input activations by multiplying each of them with a different p*p weight matrix and adding (e.g., term to term) all results together into a single p*p matrix which becomes the input activation matrix of the SBT. This aspect is described in greater detail in connection with FIGS. 8C-8E below.

While GPUs are discussed in certain example embodiments herein, it will be appreciated that ASICs and FPGAs may also be designed and used in place of such GPUs in certain example embodiments.

Figure 2:
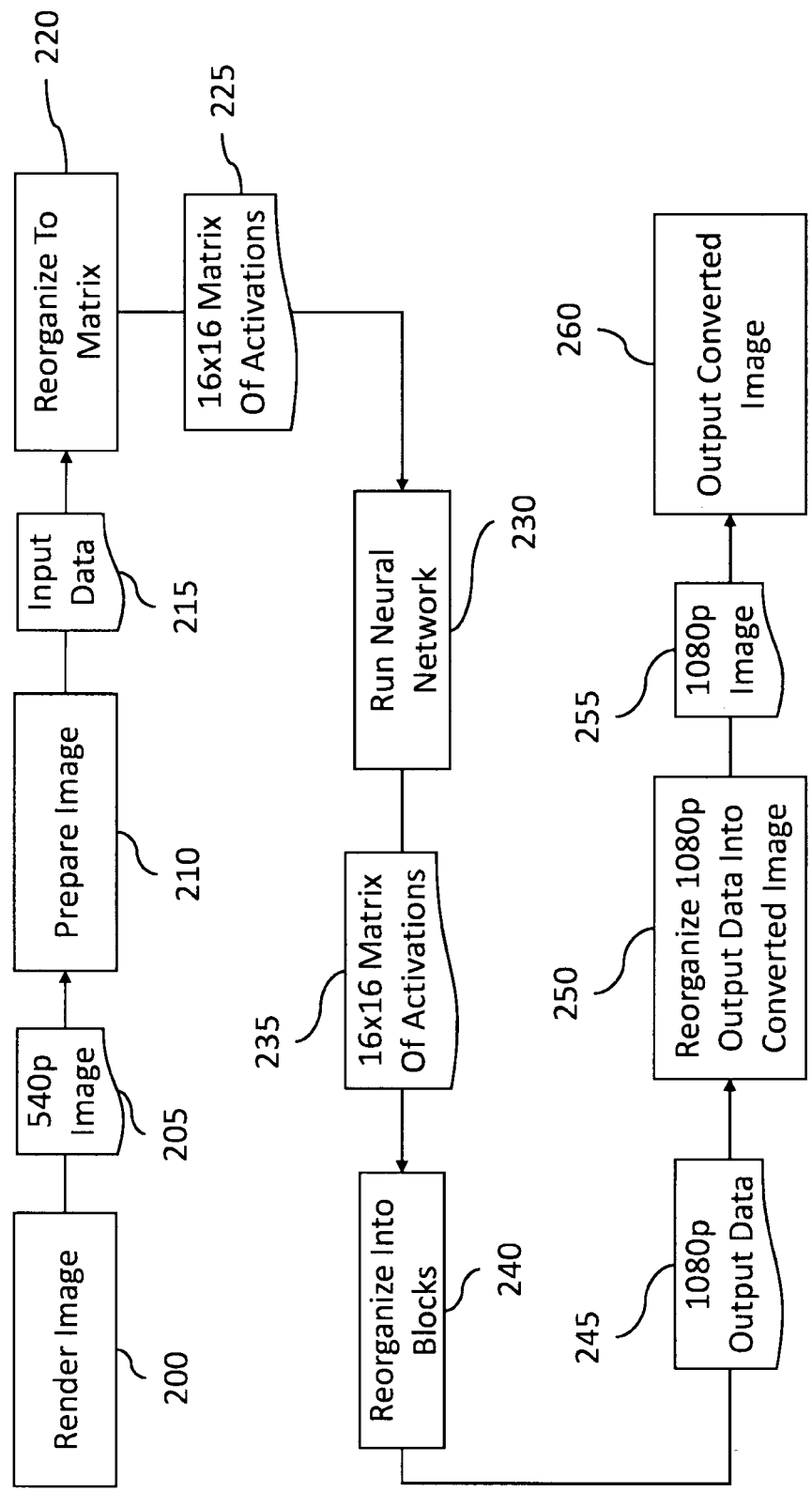
FIG. 2 is a flow chart showing machine learned upconversion process that may be executed on the computer system of FIG. 1.

Description of FIG. 2

FIG. 2 is a flow chart showing a machine learned upconversion process that converts a 540p image to a 1080p image that may be executed on the computer system of FIG. 1. FIGS. 3-7 are discussed below and provide additional details regarding certain aspects of the upconversion process shown in FIG. 2. It will be appreciated that while images and pixel data are described in connection with the examples herein, that other types of signals may be used in connection with the techniques herein. For example, each "pixel" within the images that are discussed herein may be thought of as data that is being sampled from an overall signal (e.g., the image). Accordingly, techniques for transforming or otherwise converting a source signal (e.g., an image) to a transformed or converted signal (e.g., a higher resolution image) are discussed herein.

At step 200, a 540p source image 205 is rendered by game engine 110. In certain example embodiments, and as discussed herein, the source image may come from other sources, such as real cameras, movies, television shows, broadcast television, or the like. For example, the techniques herein may be used to transform a source 540p signal that is received for a television program (for example a live broadcast of a sporting event) into a 1080p signal that is then output for display to the user. Further, while a 540p is discussed in connection with the example in FIG. 2 (and elsewhere herein), the techniques may be applied to images of other sizes. It will be appreciated that the details of the neural network 112 (e.g., the coefficients or L and R) employed as part of the upconversion process will change should the details of the source and/or converted image change (e.g., should the resolution of such images be adjusted). For example, a neural network for upconverting to 1080p from 540p will be different than one upconverting from 1080p to 1440p (e.g., 2560×1440). It will also be appreciated that while the example shown in FIGS. 3-7 relates to transforming a 540p image to a 1080p image, the techniques herein may be applied to other image sizes (e.g., 720p to 1080p; 480p to 1080p, 1080p to 1440p, 1080p to 4k/3840×2160, 720p to 4k, etc.).

In certain example embodiments, the initial image may be rendered or otherwise generated with motion vector information and/or depth information (e.g., z-buffer data). This information may be used to improve the resulting converting image quality. Such information may be, in certain example embodiments, added to the activation matrix that is created based on each pixel block.

In certain example embodiments, upscaling ratios that are not integers (or not the same ratio horizontally and vertically) may also be performed in accordance with the techniques discussed herein. For example, in the 720p to 1080p case, an output block may be 6×6 pixels (with 3 channels hence 108 output values), which can still easily fit into the 16×16=256 output values of the SBT output that is discussed herein. Additional ratios, such as, for example, 7/3 (e.g., which may correspond to converting from 1920×1080 to 4480×2520) are also possible in accordance with certain example embodiments. In such an example embodiment, a source image may be divided into 3×3 blocks (with context data added thereto) and trained to output 7×7 blocks (which would still fit into the 16×16 output block that is discussed herein). In certain example embodiments, applications that that output images in resolutions that are not as common now may be modified. The techniques herein may use, for example, alternative ratios to handle upscaling. For example, a horizontal upscaling ratio of 8/7 (which may then be multiplied by some integer ratio) may be used in certain example embodiments to compensate or address analog TV anamorphic deformation.

In any event, a 540p image 205 is produced (e.g., rendered) by a game engine or the like at step 200. That image is then prepared at step 210. This aspect of the process is described in greater detail in connection with FIG. 3 and involves dividing the image into separate input channels or input data 215. Advantageously, the input data 215 may be stored to registers (e.g., 16 bit registers) of GPU 106 at this point. Once the input data 215 is generated, it is then stored to registers of the GPU. The input data 215 (or matrix of activations 225) may remain within the registers (or other internal memory) over the course of being applied against the neural network. This type of implementation advantageously allows the (relatively) slow DRAM 104 in system 100 to be bypassed during the processing that is performed by the neural network (e.g., where the multiple matrix of activations across the image are processed by the GPU). This is facilitated by forming the data to fit within the registers and thus allowing for more effective use of the massively parallel processing that is provided by the GPU 106.

In certain example embodiments, other types of hardware besides GPUs may be employed for handling the translation of the input data 215 into the 1080p output data 245. In general, it is preferable to keep such data in on-chip memory (e.g., registers on a GPU, or SRAM FPGAs that handle deep learning applications). Accordingly, once the input data 215 is placed into the registers (or similar fast memory) it may remain there until the 1080p output data 245 is generated (or the final matrix of activations is generated) and used to construct the final converted image (which may occur in DRAM).

Returning to FIG. 2, the input data 215 is then reorganized into a matrix at step 220 to produce a 16×16 matrix of activations 225. This step is discussed in greater detail in connection with FIG. 4.

At step 230, the initial matrix of activations 225 is run through the trained neural network 112 at step 230 to produce a 16×16 matrix of activations 235 that have been transformed by the neural network 112. As discussed herein, this may involve applying separable block transforms to the matrix of activations. This aspect of the process is discussed in greater detail in FIG. 5.

Once the matrix of activations has been run through the neural network at step 230, it is the then reorganized into blocks at step 240 to produce 1080p output data 245. This aspect of the process is discussed in greater detail in FIG. 6.

At step 250, the 1080p output data 245 is then reorganized into a 1080p image 255 that is output to display 116 at step 260. This aspect of the process is described in greater detail in FIG. 7. As noted above, the processing that is shown between step 220 and 250 (including both of those steps) may occur entirely in the registers of the GPU (or other internal memory) without the need to transfer data to DRAM (or other relatively "slow" memory). Accordingly, for example, a given matrix of activations 225 may remain stored within the same semi-conductor hardware (e.g., the same register or location in memory) while it is being run through the neural network. Such processing may be applied to each matrix that is generated for a corresponding pixel block of an image (or other signal), which may then be concurrently executed across plurality hardware processors of, for example, a GPU (or other hardware resources).

Figure 3:
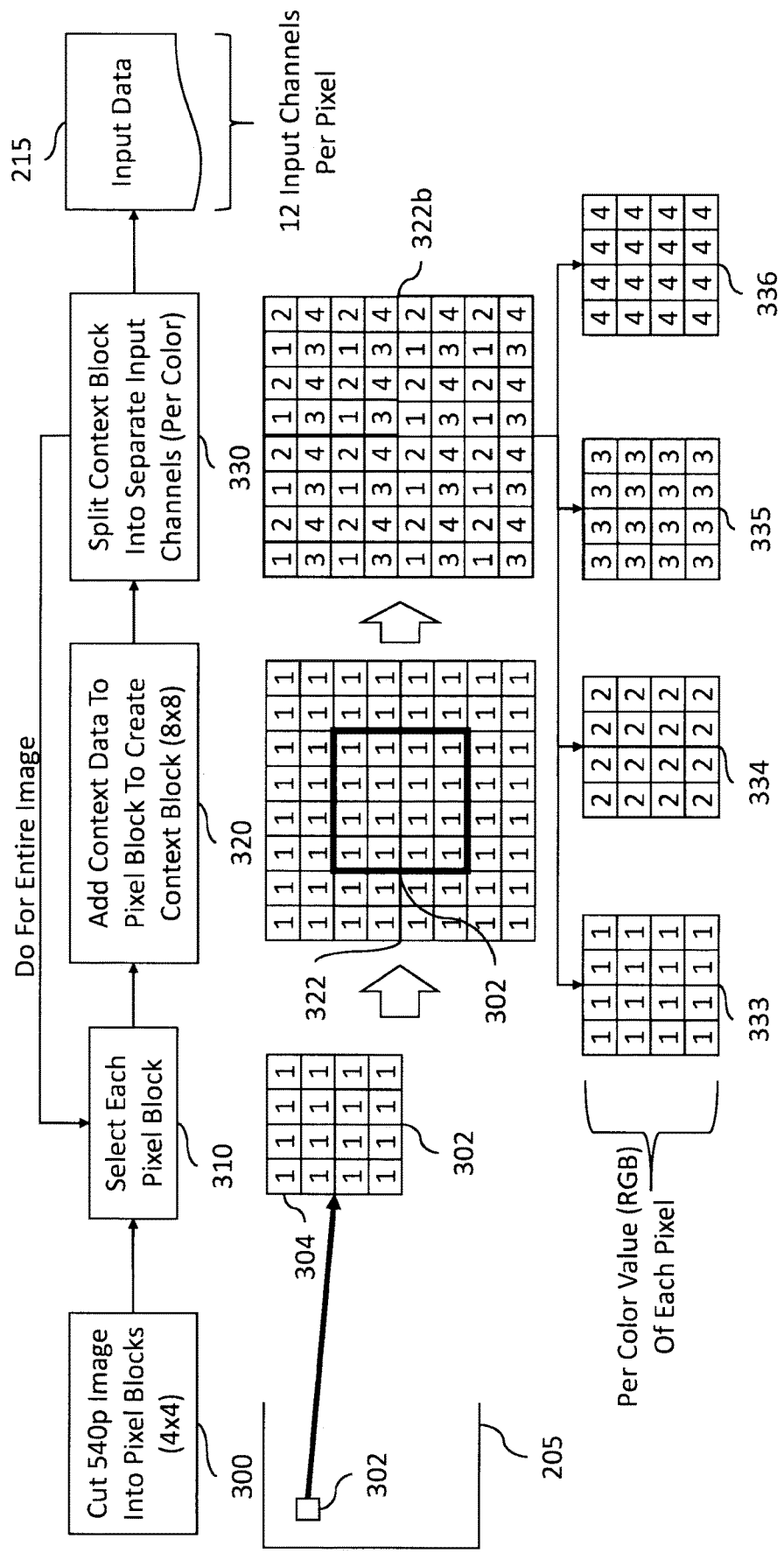
FIG. 3 is a flow chart showing an expanded view of the Prepare Image portion of the machine learned upconversion process of FIG. 2.

Description of FIG. 3

FIG. 3 is a flow chart showing an expanded view of the Prepare Image portion of the machine learned upconversion process of FIG. 2.

The 540p image 205 that is output from the game engine 110 is cut or divided into 4×4 pixel blocks at step 300. Block 302 represents one of the pixel blocks from the image and 304 is one pixel within that block. Each pixel may be represented by different color values in RGB (described in greater detail in step 330). It will be appreciated that while color values (e.g., RGB values) are discussed in connection with certain example embodiments, that other types of data may be stored into blocks. For example, the techniques may be used in connection with grey scale images where each pixel stores an amount of light for that pixel. In certain example embodiments, color information may be processed/provided by using YUV or YCoCg formats. In certain example embodiments, the luminance (Y) channel may be used with the techniques discussed herein and thus processed (e.g., upscaled) using Neural Networks.

In certain example embodiments, block sizes other than 4×4 may be used. For example, 8×2 pixel blocks may be used in certain example embodiments. In certain examples, the size of the pixel block may be advantageously determined based on, or a multiple of, the dimensions of the hardware being used for the matrix multiplication. Thus, when hardware acceleration supports 16×16 matrix multiplication, 4×4 or 8×2 blocks may be initially selected. Such sizes may advantageously allow for separately processing the pixels along one dimension of the matrix while processing the channels along the other dimension.

Selection of a block size may also be based on the amount of available fast memory in a system (e.g., registers, etc.). Keeping the blocks and corresponding data for the matrices in fast memory during the neural network processing advantageously may facilitate increased performance (e.g., to allow real-time or runtime image conversion). Thus, a 4×4 block size may be appropriate for certain types of hardware, but other block sizes are also contemplated and may be used in connection with the techniques discussed herein.

In any event, each block from the original 540p image 205 is selected at 310. Thus, in certain example embodiments, there may be over 30,000 pixel blocks that are subjected to the processing described in FIG. 3 for a single 540p image. The subsequent processing for all of the pixel blocks may be performed in parallel by using, for example, the hardware resources of a GPU or other processor. In certain instances (e.g., depending on the number of individual processing units within the overall system) multiple groups may be processed in sequence. For example, a first group of the pixel blocks may be processed in parallel (e.g., 15,000) and then another group (the remaining 15,000) may be processed. The processing for all of the blocks may, from the perspective of a user, still be performed in parallel.

At 320, context data is added to the 4×4 pixel block to create an 8×8 context block 322. The context data may be based on, derived, or a function of the pixel values of the pixels in the image that surround a given pixel block. In certain examples, the pixel data that is used for the context block may remain unchanged from the pixel outside of the 4×4 pixel block. In certain example embodiments, other context block sizes (either absolute or relative) may be used, for example a 12×12 context block may be used for a 4×4 pixel block. In certain example embodiments, pixel data may be selected along the horizontal and/or vertical axes with discounting those along a diagonal axis. Thus, if a pixel block is represented by X1-X4 as shown in the below table, the horizontal values (A1-A4) and the vertical values (B1-B4) may be added to the content block while the diagonal values (C1-C4) are not used within the context block.

TABLE 1

| C1 | B1 | B2 | C2 |
| A1 | X1 | X2 | A3 |
| A2 | X3 | X4 | A4 |
| C3 | B3 | B4 | C4 |

In certain implementations, one pixel along the diagonal may be used, while two (or more) along the horizontal or vertical may be used within the context block. In certain example embodiments, multi-resolution data may be included within the context block to increase the receptive field along the directions of "slightly tilted lines" which aliasing may extend far away from the block. For example, one layer could contain 4×4 blocks calculated as the average of the 8×8 context block, then a 4×4 block calculated as the average of the 16×16 context block, etc. Such data may help to increase the receptive field with a limited cost in terms of number of inputs.

At 330, the context block 322b is split into four separate input channels 333, 334, 335, and 336. The numbers represented by each of the input channels shows the makeup of that particular channel. Accordingly, each 1 that is shown in 322b in FIG. 3 is used to form input channel 333 and each 2 is used of form input channel 334, and so on. Each of the numbers represents a value for one of the RGB values for the correspondingly pixel. Thus, each context block 332 is repeated or otherwise performed for each value of Red (R), Green (G), and Blue (B) (or the context block simply stores 3 values per pixel). Accordingly, there are 12 input channels per pixel block that are created as a result of the prepare image step 210. Additionally, in this example embodiment, there are 3 input channels per pixel (one for each of R, B, G values of the pixel). The 12 input channels created for each pixel block form the input data 215. This process is repeated or otherwise performed across all of the pixel blocks for a given image and is, usually accomplished in parallel. As discussed herein, the multiple pixel blocks (and/or context blocks) may be processed in parallel in certain example embodiments.

In certain example embodiments, signal data for a source signal may be cut or split into at least two blocks. In certain examples, such blocks may then be processed independently by using the SBTs discussed herein.

Figure 4:
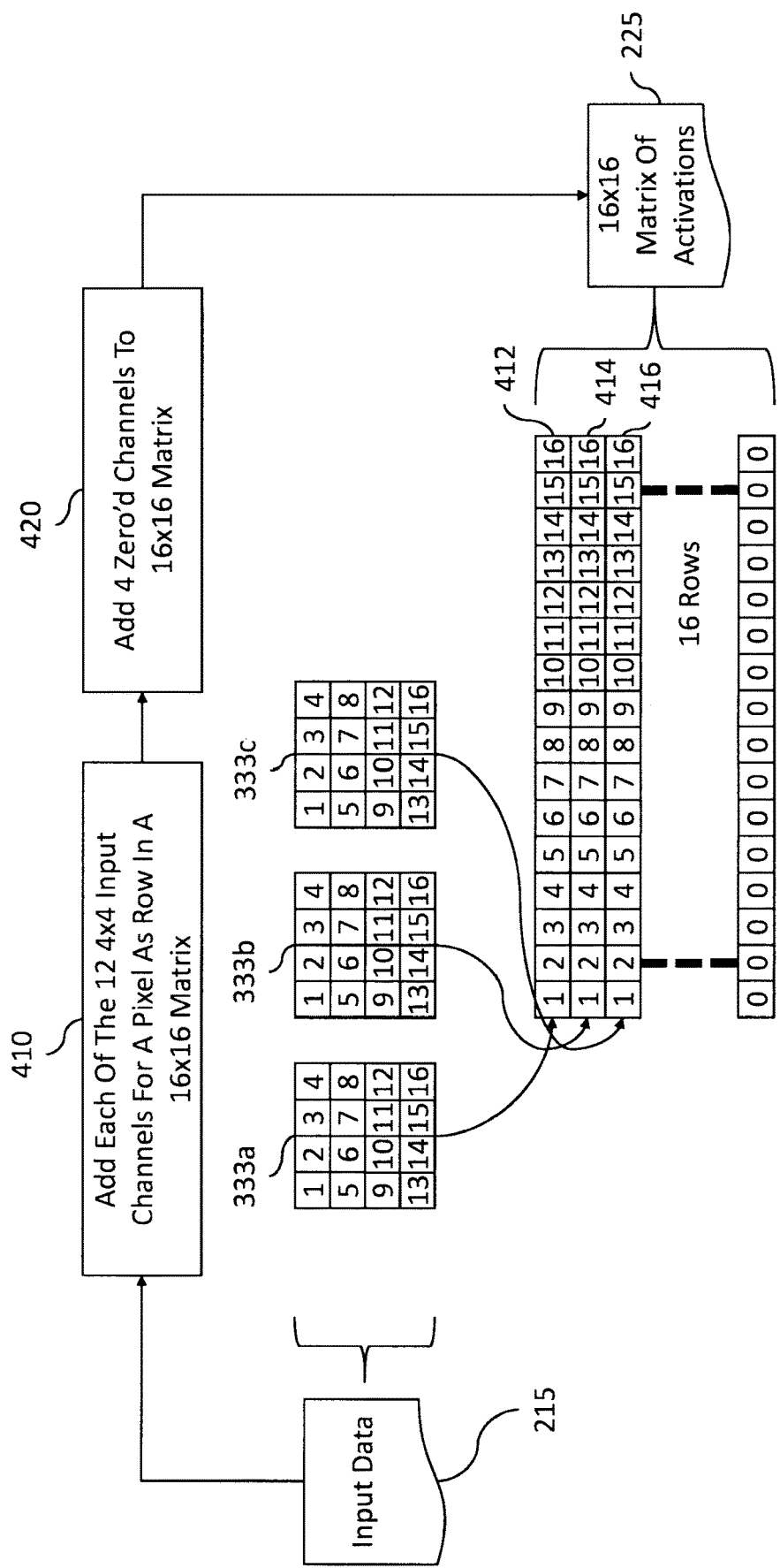
FIG. 4 is a flow chart showing an expanded view of the Reorganize To Matrix portion of the machine learned upconversion process of FIG. 2.

Description of FIG. 4

FIG. 4 is a flow chart showing an expanded view of the Reorganize To Matrix portion of the machine-learned upconversion process of FIG. 2.

In this flow chart the input data 215 for each pixel block (e.g., the 12 input channels) is reorganized into a single 16×16 matrix 225 at step 410. For example, the values of input channel 333a (e.g., that has the red color values of "1" pixel value that is in the context block 322b) are inserted (e.g., added) to row 412 of the matrix 225. The values of input channel 333b (the blue color value of that same "1" pixel from the context block) are inserted to row 414. And the values of input channel 333c (the green color value of that same "1" pixel from the context block) are inserted to row 416. This process is repeated or otherwise performed for all 12 rows and thus the 16×16 matrix of activations 225 is populated with values from the sampled pixels of the source image (e.g., a source signal). Accordingly, the resulting 16×16 matrix may include data for a single pixel within multiple rows. For example, the pattern of data for each of the pixels used to feed rows 412, 414, and 416 is superposable from one pixel to the next. It will be appreciated that the data may be inserted into a matrix on a column by column basis instead of row-by-row basis as is shown in FIG. 4. Accordingly, columns may be substituted for the rows mentioned herein in certain example embodiments.

Examples of superposable patterns may include, for example, two horizontally located neighbor blocks of 4×4 pixels (e.g., after 4 pixels of horizontal translation). As another example, any two rows (e.g., of 4×1 pixels) within a 4×4 block of pixels may be superposable. Similarly, a row of 4×1 pixels is superposable to a column of 1×4 pixels (after a 90° rotation). The following pattern of blocks are superposable. Specifically, the pattern of X's in the below table (accounting for rotation and symmetry) are superposable with the pattern of samples represented by the Y's.

TABLE 2

| X | | Y | Y | Y |
|---|---|---|---|---|
| X | | | | Y |
| X | X | | | |

Other types of data (e.g., different types of signals) may also be superposable such that individual pieces that makeup a sample piece of data are split or separated into separate channels. In other words, depending on the nature of the source signal (e.g., whether an image or some other data), at least two of the rows (or columns) in an initial activation matrix may correspond to similarly organized or structured data from each sample that is taken from the underlying source. In the case of images, the similarly organized or structured data may be individual pixels (e.g., where multiple channels are used per pixel) or groups of pixels following the same shape but at different positions in the image. In certain example embodiments, at least two of the rows or columns of the activation matrix may be generated based on a common pattern of data from each sample in the underlying source signal.

In certain example embodiments, as there are 12 input channels, the remaining 4 rows of the 16 row matrix are set to zero at step 420 (or otherwise set to values such they are ignored during the matrix processing) to create matrix of activations 225 that will then be subjected to the neural network processing.

In certain example embodiments, all 16 (or however many rows there are in the matrix of activations that will be used) may be populated with data. In certain example embodiments, the 4 additional rows (or the "extra" rows that do not have the initial color information) may be populated with additional information. For example, the game engine 110 may supply depth information regarding objects or other aspects of the image in question. This information may be incorporated into the additional rows of the 16×16 matrix. In certain example embodiments, motion information regarding objects or other aspects of the image may be supplied from game engine 110 and incorporated into the 16×16 matrix.

Figure 5:
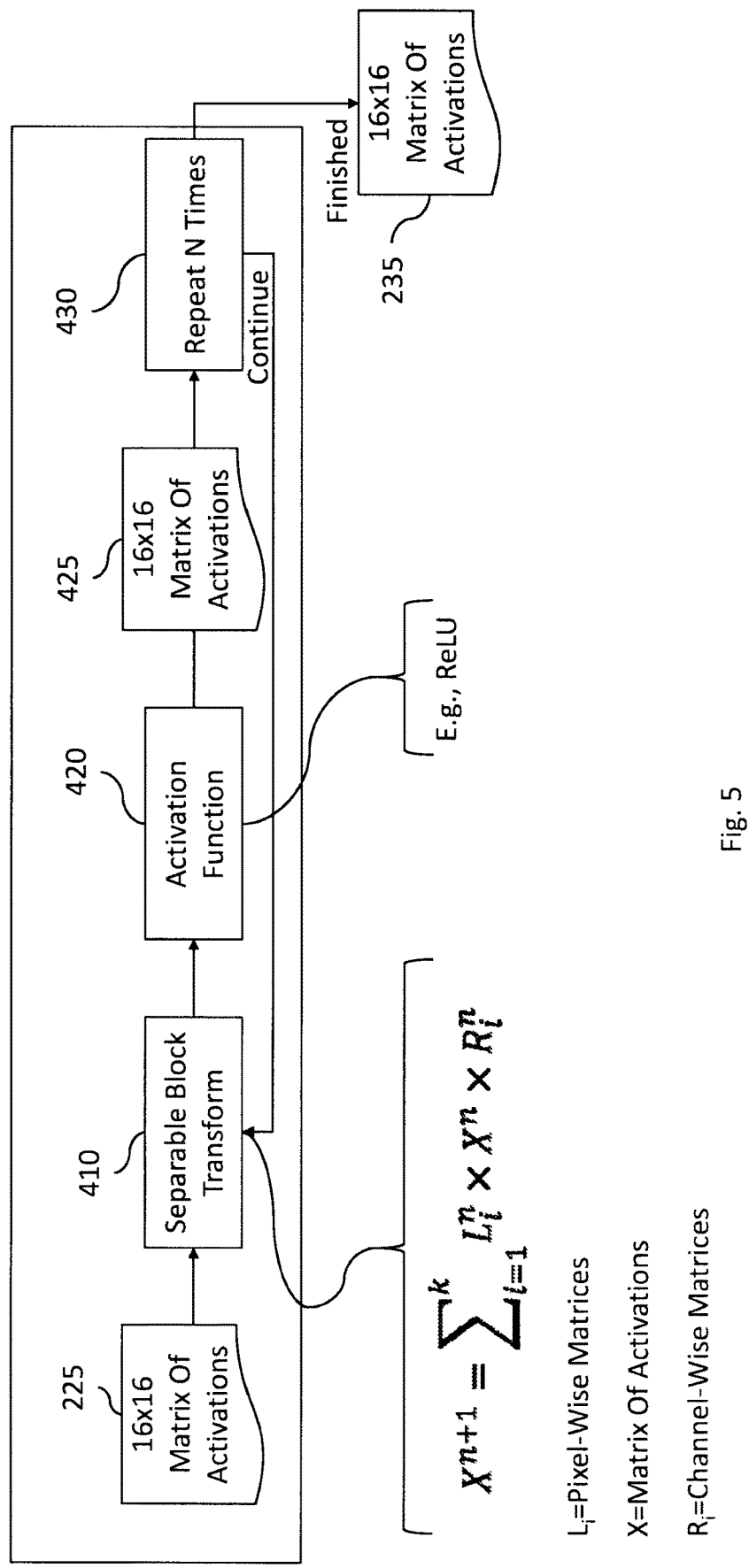
FIG. 5 is a flow chart showing an expanded view of the Run Neural Network portion of the machine learned upconversion process of FIG. 2.

Description of FIG. 5

FIG. 5 is a flow chart showing an expanded view of the Run Neural Network portion of the machine learned upconversion process of FIG. 2. The running of the neural network against the matrix of activations may include applying separable block transforms that make use of the LXR operation discussed herein.

The matrix of activations 225 is run through the neural network 112. An example of how such neural networks may be trained is discussed in connection with FIG. 9. The output of such training may be a matrix of coefficients (L and R) that have been "trained" on example training datasets.

As part of the neural network processing in step 230, the matrix of activations 225 that is generated from the input channels is run through a separable block transform at step

410. The equation that represents this process is illustrated in FIG. 5 with L and R being 16×16 matrices (e.g., each with 256 coefficients that in the 16×16 matrix) that have been generated using the training system discussed in FIG. 9.

L is a 16×16 pixel-wise matrix (or other sample-wise dependent aspect) and is multiplied on the Left. This applies a linear transform to all channel values of each activation pixel (e.g., each piece of sample data), which may be each column in the activation matrix, independently from the pixel position (e.g., the same transform for each pixel).

R is a 16×16 channel-wise matrix and is multiplied on the Right. This applies a linear transform for all pixel values of each activation channel (e.g., each row of the activation matrix) independently from the channel position (e.g., the same transform for each channel).

The transform can also be expressed as follows:

$$X^{n+1} = \sum_{i=1}^{k} L_i^n \times X^n \times R_i^n$$

Where k varies between 1 and $p^2$ for a p*p matrix (e.g., with p=16 in the example discussed above). Thus, for example, k may be 16 in certain example embodiments. This may provide a more expressive layer with more trainable degrees of freedom (e.g., in terms of weights, coefficients of the L and R matrices, etc.). In certain examples, this may also allow for pruning by removing LXR transforms one by one at training time to reduce complexity while preserving quality of the final image. Such aspects as discussed in greater detail in connection with the training process.

As part of the running of the neural network an activation function 420 is applied. This may be ReLU (rectified linear unit)—e.g., if value is negative, set to 0. If the value is positive, leave it as is. Other types of activation functions (e.g., a linear function, a tanh function, a binary function, a sigmoid function, different versions of ReLU such as leaky, parameter based, and ELUs, Swish, etc.) may also be used depending on the particular application. For example, image processing may use one type of activation function and natural language processing may use another. In certain example embodiments, the type of activation function that is used on a given layer may differentiate between the layers. For example (e.g., in connection with the example discussed in FIGS. 2 and 5 for upconverting images), an ReLU activation function may be used in layers 1 through n−1 (where n in the number of layers), with a Sigmoid activation function being used at the $n_{th}$ (e.g., last) layer.

This processing produces a transformed matrix of activations 425. That is represented as $X^{n+1}$.

The processing shown in FIG. 5 may be repeated or otherwise performed for a predetermined number of times or layers (e.g., 4). Thus, the matrix of activations will be changed from the initial matrix of activations 225 to the finished version of the matrix of activations 235 by application of the various L and R matrices that have been trained. In certain example embodiments the number of layers may vary between 2 and 12 or between 3 and 8. In certain example embodiments, more layers may be used with the understanding that additional layers may decrease performance. Thus, the number of layers may be selected based on particular application needs and balancing the resulting quality of the produced converted images and the performance of the upconversion process. As hardware becomes faster (or performance is less of a controlling factor), additional layers may be added. In certain example embodiments, the number of layers may be dynamically controlled by the neural network 112, the video game application 108 (or other application, such as the operating system, that is handling the conversion process). For example, the system may determine the amount of time that it is taking process images and add or remove layers based on such a determination. For example, if the conversion process is taking too long for real-time processing, then a pre-trained network with one or more fewer layers may be used). Such techniques may be beneficial to account for different types of hardware resources that are being used by a given computing device.

The following pseudo code may illustrate the 16×16 to 16×16 matrix multiplication (in this example, matrix "Left" multiplied with matrix "Right") processing shown in FIG. 5:

TABLE 3 for (step=0 to 15)
  for (j=0 to 15)
    for (i=0 to 15)
      Result[i][j] += Left[step][j] * Right[i][step]

Where Result[i][j] is the coefficient at the $i^{th}$ column and $j^{th}$ row (being initialized to 0 before the loop).

The use of a separable block transform (SBT) at 410 in certain example embodiments may be viewed as an alternative to using a fully connected/linear layer. A linear layer (e.g., a fully-connected layer) is a matrix multiplication of an unstructured vector of input activations given an unstructured vector of output activations. For example, a 256×256 linear layer can be represented by a 256×256 matrix of independent weights and applied against 256 unstructured independent inputs. A potential downside to this number of coefficients within a layer is that it may have too many coefficients (e.g., degrees of freedom) to train or calculate at runtime (e.g., to provide for real-time image processing). Accordingly, certain example embodiments may advantageously replace such a linear layer by, for example, a "low rank approximation," an example of which is an SBT. In certain example embodiments, an SBT layer may be represented by the sum of LXR products (as shown above) with the 256 inputs and outputs structured into a 16×16 matrices. As noted above, the generalized version of this may be represented as:

$$X^{n+1} = \sum_{i=1}^{k} L_i^n \times X^n \times R_i^n$$

An SBT layer may also be used to generate a special case SBT that is similar to or equivalent to a linear layer. Specifically:

$$X^{n+1} = \sum_{i=1}^{16} \sum_{j=1}^{16} L_{i,j}^n \times X^n \times R_{i,j}^n$$

The $L_{i,j}^n$ matrix is set to a special form where each coefficient $l_{i,j}$ of coordinates i,j is set to 1 and all other coefficients are set to zero. When $l_{i,j}=1$ and the other coefficients are zero, the L"X" product is then the result of: extracting the $i^{th}$ line of the matrix $X^n$; and re-positioning it at the $j^{th}$ line while the rest is set to zero. Accordingly, each of the resulting $j^{th}$ line of $X^{n+1}$ is a general linear combination of all the lines and thus coefficients of the $X^n$. Stated differently, all the 256 output values in the $X^{n+1}$ matrix are linear combinations of the 256 input values of the $X^n$ matrix, which is the same as a linear layer of 256×256 coefficients. This construction thus uses 16×16×16×16=256×256 free coefficients (in the IV matrices). With this in mind, separable block transform techniques may be applied in situations where linear layers are used (e.g., it may be used as a replacement).

When compared to linear layers, SBTs may provide one or more of the following advantages:

In certain example embodiments, SBTs may be gradually pruned by removing individual LXR terms (e.g., those that contribute the least to the quality of the result). Each removed LXR term may reduce the complexity of the training and runtime calculations, the total number of weights to be stored and transmitted, and the remaining learning cost.

In certain example embodiments, 16×16 SBTs can be trained with fewer than 256 LXR terms from the start. This may also decrease the number of weights to learn and the number of training and runtime operations.

In certain example embodiments, for 16×16 SBTs, a sum of less than 8 LXR terms will cost less multiplications than a linear layer. For reference, a 256×256 linear layer (hence the multiplication of a 256×256 matrix with a vector of size 256) costs $256 \times 256 = 2^{16}$ multiplications. In contrast, a single SBT costs two 16×16 matrix multiplications hence 2×16× $16 \times 16 = 2^{13}$ multiplications. Accordingly, a sum of k LXR terms will cost $k*2^{13}$ multiplications and thus cost less than a linear layer if $k < 2^3$ (e.g., 8).

A benefit of SBT compared to linear layers may include allowing for the reduction of the number of weights (e.g., in a kind of weight reuse scheme). It will be appreciated decreasing the number of weights may have an impact (e.g., perhaps significantly so) on performance because it may reduce the memory traffic for handling the weights. Due to this more space in memory can be devoted to activations. The pressure on memory may also be alleviated (e.g., decreased)—e.g., in the form of external memory bandwidth or internal memory size.

In certain example embodiments, for 16×16 SBTs, a sum of less than 128 LXR terms will cost less weights (and thus storage and training time) than a linear layer. For reference, a 256×256 linear layer costs $2^{16}$ weights while a single 16×16 SBT term costs $2 \times 256 = 2^9$ weights and thus $2^7 = 128$ sums to reach weights equality.

In certain example embodiments, SBTs may also be used to replace larger linear layers (e.g., 1024 to 1024, such as those used in natural language processing) with a 32×32 SBT layer. This would allow for a smaller number of weights while maintaining an acceptable level of quality. Accordingly, the technical implementation of the SBT techniques discussed herein may be used in a variety of different applications and scenarios to achieved increased efficiency with little or no (e.g., perceived) loss in the quality of the transformed data.

In certain example embodiments, the size of a sum can be different for each layer, learnt by trial and error and/or by global pruning. In certain example embodiments, a smaller version of the SBT network can be trained through distillation from a trained bigger version of the SBT network.

Figure 6:
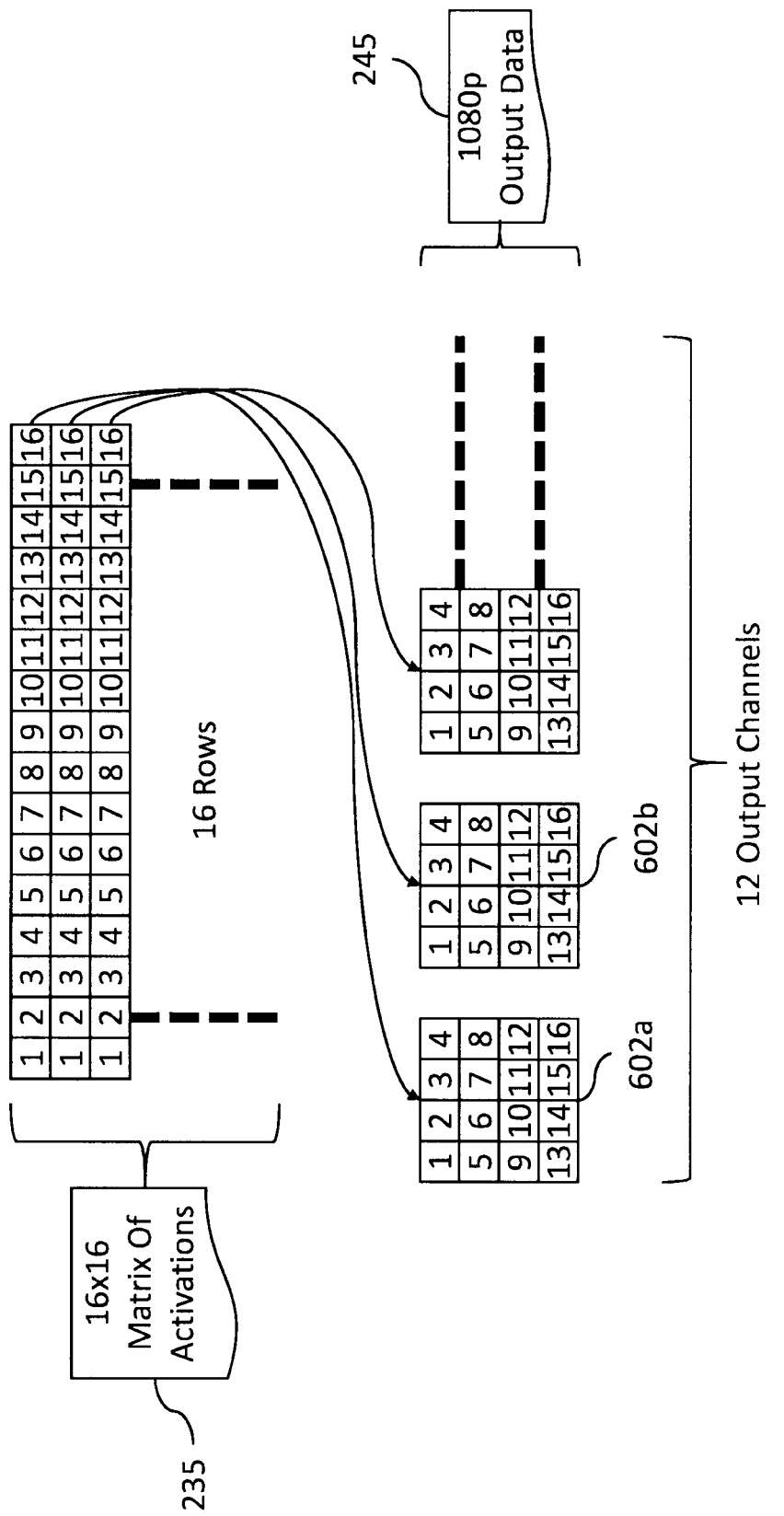
FIG. 6 is a flow chart showing an expanded view of the Reorganize Into Blocks portion of the machine learned upconversion process of FIG. 2.

Description of FIG. 6

FIG. 6 is a flow chart showing an expanded view of the Reorganize Into Blocks portion of the machine learned upconversion process of FIG. 2. Once the 16×16 matrix of activations 235 has been generated by running it through the neural network 112, it is then reconverted back into the form of multiple channels. Specifically, each row (or more specifically the first 12 rows as the last 4 are all zeroed out) of the matrix of activations 235 is reorganized into a corresponding block of one output channel. Thus, as shown in FIG. 6, the first row of the matrix of activations 235 is converted back into the first block 602a (e.g. the red values of the top-left sub-pixels) of the 1080p output data 245. And the second row of the matrix of activations 235 is converted back into the second block 602b (e.g., the green value of the top-left sub-pixels of that same channel) of the 1080 output data 245, etc. All 12 blocks (4 sub-pixel channels per block*3 channels per color value) of the corresponding 12 rows of the matrix of activations 235 thus create the 12 output channels of the 1080p output data 245.

Figure 7:
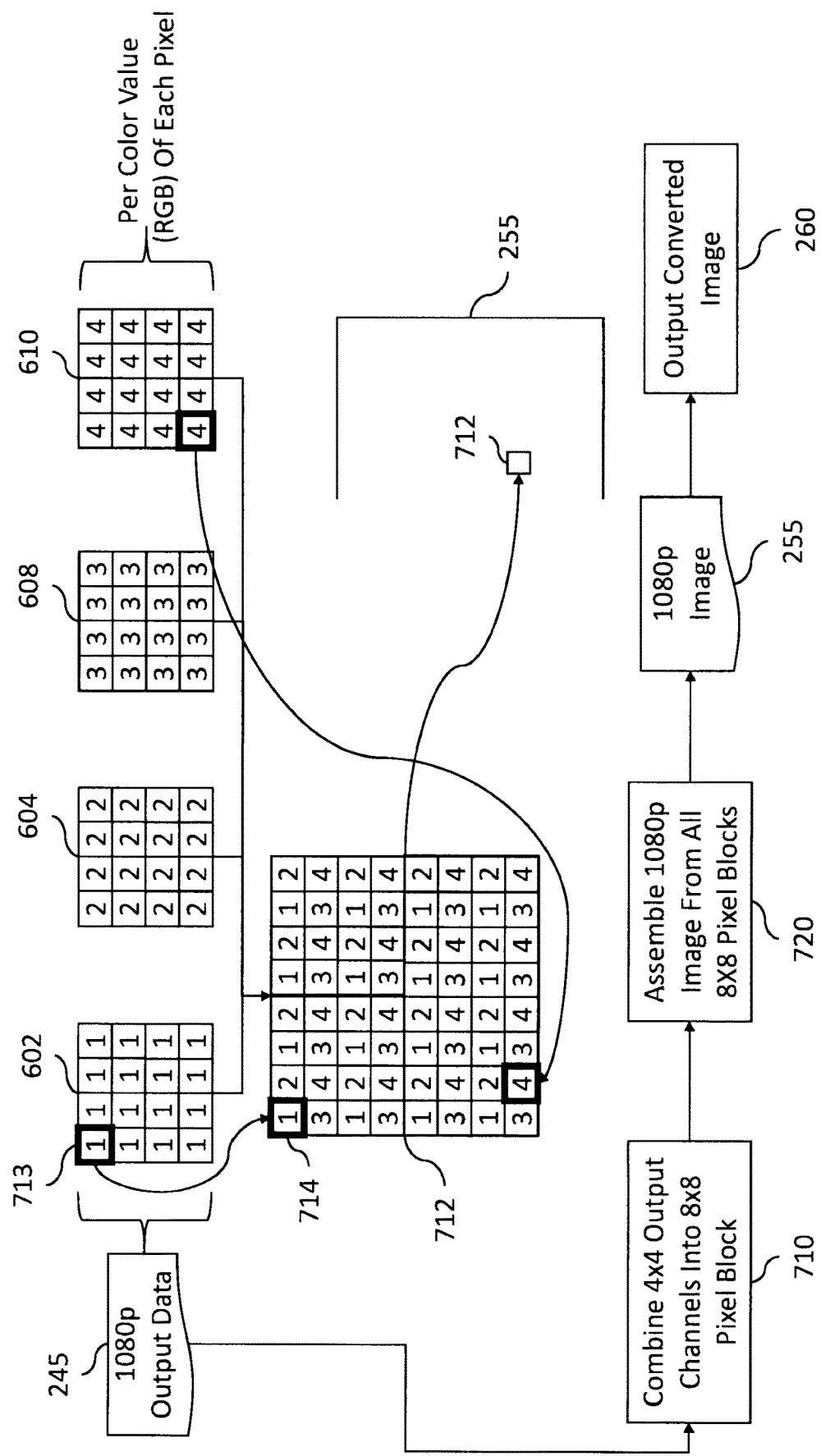
FIG. 7 is a flow chart showing an expanded view of the Reorganize 1080p Output Data Into Converted Image portion of the machine learned upconversion process of FIG. 2.

Description of FIG. 7

FIG. 7 is a flow chart showing an expanded view of the Reorganize 1080p Output Data Into Converted Image portion of the machine learned upconversion process of FIG. 2. The 1080p output data 245 (e.g., the 12 output channels of 4×4 blocks) is combined at step 710 into a single 8×8 pixel block 712.

FIG. 7 illustrates an example how the values from the blocks (e.g., illustrated the highlighted value 713 from block 602) may be used to generate a corresponding pixel value 714 (also highlighted) in the pixel block 712. This includes combining the color values to create each pixel. Thus, the Red, Green, and Blue values of 713 from each of the Red (e.g., from 602a), Green (e.g., from 602b), and Blue blocks 602 will be used to generate the RGB value for pixel 714 in pixel block 712. The remaining 63 pixels in the 8×8 block will be generated in a similar manner. The resulting 8×8 pixel block 712 is then positioned within the overall 1080p image 255.

This process of assembling 8×8 pixel blocks is repeated (e.g., in parallel) for each of the 1080p output data 245 that has been generated for a single (original) 540p image. From the multiple 8×8 pixel blocks 712, a 1080p image 255 is assembled at 720. Each of the 8×8 pixel blocks is positioned within the overall image (e.g., based on the order in which the source image was processed). Thus, if the source image is processed from left to right and top to bottom, then the output image is constructed in a similar manner. Alternatively, in certain example embodiments, position data for each pixel block may be stored as, for example, metadata for each of the created input channels 215 when it is originally created to determine where the 8×8 pixel block should be positioned.

Once the 1080p image 255 is created, it may then be output at 260 or otherwise stored (e.g., into a frame buffer) for eventual display on display device 116.

Description of FIGS. 8A-8B

FIGS. 8A-8B shows an example image 802 that is 128× 128 pixels. Image 802 has been applied to a neural network 803, which has been trained according to the techniques discussed herein (e.g., in connection with FIG. 10). After applying image 802 to neural network 803, upscaled image 804 is generated. Image 804 is version of image 802 that has been upscaled to 256×256 pixels.

FIG. 8B includes versions of the images from FIG. 8A that have been "zoomed" in to create side-by-side 512×512 pixels versions of those images. As shown in FIG. 8B, image 822, which is a zoomed in version of image 802, includes artifacts that are not found in image 824, which is the zoomed in version of image 804. It will be appreciated that the images shown in FIGS. 8A and 8B are shown by way of example.

Description of FIGS. 8C-8E

FIG. 8C shows an example block diagram view of a single "block tower" according to certain example embodiments. FIGS. 8D and 8E are example block diagrams that show how several block towers may be used according to certain example embodiments.

FIG. 8C shows a block diagram that corresponds, in certain respects, to the examples discussed in connection with FIGS. 2-7. Specifically, a block of pixels 830 is selected from a source image 832. For block 830, a 16×16 activation matrix 836 is prepared at 834 (e.g., as described in connection with FIGS. 3 and 4). Activation matrix 836 is then run through the SBT network 838 (e.g., as shown in FIG. 5) to create output matrix 840. Next, an output pixel block 844 is created at 842 (e.g., as shown in FIGS. 6 and 7) and then placed into the converted image 846.

It will be appreciated that using a larger number of channels and/or L&R matrices (e.g., 32×32 or 64×64) may be beneficial as it may provide for more expressivity during processing. However, a downside to this approach is that such matrices may not fit into local "fast" memory (e.g., registers) and thus may require the use of slower DRAM during the processing. While larger sizes of fast memory are possible in the future, the underlying issue of not having "enough" fast memory may still remain.

In certain example embodiments, two 16×16 SBT towers (e.g., L&R matrices) with corresponding activation matrices of 16 channels may be used. With such an implementation, the requirement of having more and more local fast memory may be (at least partly) addressed while also still benefiting from the increased expressivity (higher degrees of freedom) that using an increased number of channels can provide (e.g., 32 or 64, etc.). In such instances, SBTs may be processed sequentially or processed in parallel. In such an implementation, a given activation matrix may be run through multiple different SBTs and the outputs combined or used together in one of multiple different ways.

FIG. 8D shows a block diagram of a summing example for using several SBTs. As with the example in FIG. 8C, an activation matrix 836 is created from a block with the source image. However, in this example, that activation matrix is applied to multiple different SBT networks. Specifically, activation matrix 836 is applied to SBT 852A, 852B, 852C, and 852D. In other words, the same activation matrix (which is derived from the same underlying pixel block) may be processed by separate SBT (e.g., L&R matrices). Such processing may be performed sequentially, in parallel or some combination thereof (e.g., two at a time). Each SBT processes activation matrix 836 differently to create four (presumably) different output matrices—854A, 854B, 854C, and 854D. These four outputs may then be summed, term to term, to create a final (e.g., 16×16) output matrix that is then processed as is discussed in connection with FIG. 8C.

FIG. 8E is a block diagram of an alternative example for using several SBTs. This example is the same as that shown in FIG. 8D, except instead of summing the results from the several SBTs, the resulting outputs may be stacked or aggregated together into a larger matrix at 860. This type of implementation may be useful to, for example, handle bigger output blocks 862 of the output image 864 which may naturally benefit from a higher number of activations in the output activation matrix.

Such techniques may be similar or compared to, for example, grouping channels/grouped convolutions as used in various CNN architectures (e.g., AlexNet, MobileNet, etc.).

Description of FIG. 9

FIG. 9 is a block diagram that includes an example training computer system 900 according to certain example embodiments. Training computer system 900 is an example of computer system 1300 that is shown in FIG. 13. In certain example embodiments, computer system 900 and computer system 100 may be the same system (e.g., the system that is used to play a video game also may be configured to train a neural network for that video game).

System 900 includes a dataset preparation module 902 that is used for preparing images (e.g. 1080p images) that are provided from a training set database 906. The images are prepared and then used to train a neural network (e.g., to determine the coefficients of L & R, including each layer of sums of L & R transforms, that are discussed herein) via the neural network trainer module 904. The neural network trainer module 904 generates one or more trained neural networks that are stored into database 908. Trained neural networks 908 may then be communicated via a network 912 (e.g., the Internet) or via physical media (like game cartridges) to various game devices 1, 2, 3, 4, 5, etc. (each of which may be an example of game device 100). In certain example embodiments, one or more trained neural networks may be delivered along with a game that is acquired by a user. For example, a user may download a game from an online store or the like and one of the components of the game may be a neural network for processing images produced by the game. Similarly, games that are provided on cartridges or other physical media may include one or more neural networks that can be used by the user to transform images produced by the game. In certain examples, multiple neural networks may be provided with the same instance of a game (e.g., an individual download or specific physical media instance) to allow for the game to output to different types of displays (e.g., 1080p in one instance, 1440p in another, 4k in another, etc.).

As discussed herein different types of neural networks may be generated and distributed to the various game devices. Thus, for example, game device 1 may receive and use a neural network that is different than a neural network that is received and used by game devices 2, 3, 4, and 5. In certain example embodiments, each game (or more generally each application) may have a corresponding neural network (or multiple neural networks) that has been generated (e.g., by system 900) for that game. Accordingly, for example, game devices may store multiple different neural networks and use different such networks based on the game (or type of game) that is being played on the corresponding game device. In certain example embodiments, multiple games may share or use the same neural network. For example, one neural network may be generated for first person shooter type games, another for strategy games, etc. Accordingly, game may be group based on their "type." Such type classifications may be based on the genre of game or may be based on another criteria, such as the type of rendering engine that the game uses to generate images therein.

In certain example embodiments, the game engine (or other service that is providing converting functionality to the game engine) may dynamically decide to select one neural network among a selection of them depending on the remaining time available to "prepare the current video frame". If the frame was rendered fast, it may have more time to be upscaled with a high quality and slow neural network (e.g., one that includes additional layers), but if the frame used up more of the typically available 16 ms (for both rendering of the frame and subsequently upscaling images at 60 frames per second), the engine could select a faster neural network (e.g., one with less layers), although not providing as high image quality as the slower ones. Such a determination may be made through a "testing" phase of a video game application program (e.g., where the game engine produces a number of example images) and/or may be performed during normal gameplay.

Returning to FIG. 9, training datasets 906 includes multiple datasets that are used as the "target." Thus, if a neural network is to be generated to convert 540p images into 1080p images, this may include different 1080p images that will be used to generate the neural network. In certain example embodiments, the type of 1080p images may be selected according to the particular use case. In the case of video games, the images may be 1080p images that have been generated by game engines natively. In certain example embodiments, the images may be from the same game engine or game for which the neural network is being used. Thus, for example, game A may include a game engine that has the ability to generate 1080p images. This may be beneficial because another version of game A may be produced that generates game images in 540p. This may because, for example, the other version of game A is created for less powerful hardware. For example, a mobile device or the like. The game engine of game A may thus be used to populate the 1080p images for training dataset(s) that will be used to train a neural network that can be used in conjunction with the other version of game A (e.g., to thereby allow it to output 1080p images—even when that version was not originally designed for such images).

In certain example embodiments, the target images (e.g., 1080p images if the network is being trained to upconvert to 1080 from 540p) should be of high visual quality. Such images may be prepared in advance and would not need to be rendered in "real-time" (e.g., at 30 or 60 frames per second). Such images may be rendered as sharp and clean and using high-end anti-aliasing settings. Advantageously, the images may be generated from the same game or game engine as the one for which the trained network will be used. In such a scenario the statistics of the training data may more closely match the statistics of the runtime data and thus the generated neural network may be better optimized for such a game.

In certain example embodiments, a default or "general" selection of images may be used. Such an implementation may provide a good cross section across multiple games. For such an implementation, the target images may be selected that are a relatively good or high quality and have a relatively good level of diversity and sharpness (e.g., without relatively visible aliasing). This type of approach may allow for using the full spectrum's available spatial frequencies.

In certain example embodiments, artificially generated images can be used where such images are rendered in pairs of low and high resolution images. In certain example embodiments, different types of images (e.g., pixel art) may be selected and upscaled (e.g., where such images may suffer from the lack of available high resolution images and may not visually look as good when upscaled through use of general purpose neural networks).

In certain example embodiments, the training computer system may be implemented in a cloud-based computing system.

Description of FIG. 10

FIG. 10 is a flow chart showing a process that may be implemented on the system shown in FIG. 9 for training a neural network that may be used in connection with certain example embodiments, including the process shown in FIG. 2.

From the training datasets 906, a plurality of target images or training images are selected. In the case of training a neural network to upconvert to 1080p, the images may be a collection of 1080p images 1000.

At 1002, each of the images within this collection is passed to the Dataset Prep Module 902 for preparing the training dataset that will be used to train a neural network. There are two sub-processes for this. The first is preparing the 1080p images into 1080p output data 1006. This aspect is discussed in FIG. 11. The second is preparing 540p images (or other images that will be used as the source images) into 540p input data 1004. This aspect is discussed in FIG. 12. The processing discussed in FIGS. 11 and 12 may be repeated or otherwise performed for each image that is used within the training dataset. In certain example embodiments, the images may be streamed (e.g. the preparation process may proceed concurrently with the training process). In certain example embodiments, the preparation of the images may be batched (e.g., 256 or cropped sub-parts of such images may be prepared in a training batch before being used as data for one step within the training process of a neural network).

The 540p input data 1004 is then used to train the neural network at 1008 until the results of the training converges coverage at 1010 close enough to the 1080p output data 1006. In other words, when the set of coefficients (e.g., L & R) converge to an acceptable approximation of the 1080p output data from the initial 540p input data. The training process is repeated until this convergence is reached (e.g., within a threshold error value or because there has not been any decrease of the error value for more than a threshold number of iterations).

Once converged, the trained neural network weights (e.g., the coefficients of the L & R matrices, which may be called the trained neural network herein) 910 may be stored to the database within system 900 and/or communicated to other computer systems (e.g., game devices 1, 2, 3, 4, 5, etc.).

In certain example embodiments, the techniques associated with SBT networks may allow for a favorable environment for pruning as each individual sum element (e.g., LXR) can be removed without interfering with the rest of the architecture—even in case of residual connections because no other connections rely directly on this specific term. In other words, each LXR term can be thought of as a single "branch" of the architecture which can be removed without disturbing the rest of the network. This type of approach may be advantageous because removing channels in a residual network may have negative results in terms of a quality and/or performance as each channel is generally used as input to a following layer downstream.

In certain example embodiments, the determination of which LXR term(s) (e.g., each SBT term) to remove (e.g., prune) may be based on calculating the global loss with and without each LXR term (e.g., the result of the calculation of L*X*R as an individual term, or part of the summation of LXR products) and then removing those terms that have the least impact to the global loss. Thus, those terms below a certain threshold may be removed or those terms in the bottom x % (e.g., 1% or 5% may be removed), then the process can re-start until reaching a given size or error goal.

In certain example embodiments, pruning may be performed for an SBT network by calculating or otherwise determining the gradient of the loss for each SBT term and removing the SBT term which has the lowest gradient (or those terms that are in a bottom percentile).

Description of FIG. 11

FIG. 11 is a flow chart showing an expanded view of how 1080p image data is prepared as part of the neural network training process that is shown in FIG. 10.

Each 1080p image 1000 is cut into 8×8 pixel blocks at 1110. Each pixel block (1122) is then selected at 1120. The pixel blocks are then split at 1130. FIG. 11 illustrates pixel block 1122 being split into separate input channels for the step at 1130. As shown in FIG. 11, the pixel values of the corresponding numbers in the pixel block 1122 are assigned to the corresponding input channel. Each channel includes 3 separate input channels per RGB value of the source pixel. Accordingly, 12 input channels are created (e.g., 1132, 1134, 1136, 1138, each with RGB, etc.) and used as the 1080p output data. This process is repeated for each of the 1080p images to create plural 1080p output data that will be used during the training process for the neural network (e.g., to determine when the neural network has converged).

Description of FIG. 12

FIG. 12 is a flow chart showing an expanded view of how 540p input data is prepared as part of the neural network training process that is shown in FIG. 10.

The 540p input data 1004 is prepared from the 1080p output data 1006 that is produced as shown in FIG. 11. Specifically, at 1210, one of the output channels from the 1080p output data 1006 is used to create a single 540p image 1212.

From the created image, the process is similar in certain respects to that show in FIG. 3 where the to be upconverted 540p image is prepared. Specifically, each 4×4 pixel block (1214) (e.g., which may correspond to the color channels of 1132 in FIG. 11) within the created 540p image is then selected at 1220.

At 1230, context data is then added around the 4×4 pixel block to create an 8×8 context block 1232*a*. The context data may be derived in a manner similar to that described above in connection with FIG. 2. At 1240, the context block 1232*b* (which may be the same as the context block 1232*a*, but with a change in indexing of activations) is split into 4 separate input channels, with each input channel including 3 channels for the respective RGB values for the pixels included in the channels. As shown in FIG. 12, the input channels are created such that the is in 1232*b* are mapped into channel 1242, and the 2 s are mapped to channel 1244, etc. The 12 resulting input channels make up the 540p input data 1004 (e.g., a 16×16 matrix) that will be used to train the neural network during the training process that is discussed in connection with FIG. 10.

With the techniques described above, the lower resolution input may be generated by down-sampling the high resolution input through point sampling (e.g., nearest neighbor). However, other down-sampling methods may be used in other example implementations.

In certain example embodiments, images that rendered fast (e.g., at 60 fps or the like) by a real-time game engine may naturally be similar to images resulting from point sampled down-sampling because each pixel value is calculated independently from its neighboring pixels. Accordingly, training a neural network by using point sampled data may be likely to better fit upscaling game engine outputs. It may also help game engines in certain example embodiments to run faster because additional costly anti-aliasing efforts may be skipped during the traditional rendering phase. Rather, such anti-aliasing may be handled more efficiently by the example neural network techniques discussed herein.

Point sampling as part of the down-sample for the training process may provide additional benefits. A critically sampled signal is a discrete signal coming from a continuous signal where frequencies reach the maximum admissible frequencies according to the Shannon-Nyquist sampling theorem (i.e., signal frequencies should not go beyond half of a sampling frequency f) while still being able to be perfectly reconstruct the continuous signal from the discrete signal without any loss.

In the case of high-resolution images, if such images are critically sampled along the spatial frequencies, then calculation of the spectrum of the whole signal (e.g., using a Discrete Fourier Transform) uses the whole admissible spectrum (e.g., from 0 to f/2). When the lower resolution input data is prepared, the usual sampling theory may lead to first removing the high frequencies of the spectrum (e.g., anything between f/4 and f/2) using a low-pass filter, then using point sampling to reduce by a factor of two. The resulting image will then respect the sampling theorem by having frequencies below half of the (new) signal spatial sampling frequency f' (which is f/2).

If the local spectrum is then calculated (e.g., a 4×4 or 8×8 pixel block), the significant frequencies of the spectrum may be mainly located in the low part of the spectrum (between 0 and f/4) or the high part (between f/4 and f/2). When point sampling is used without first using a low-pass filter, high frequencies (between f/4 and f/2) are not removed but rather may be "folded" into the low part of the spectrum (between 0 and f/4, which becomes between 0 and f'/2 in the newly down-sampled signal).

Neural networks can then take advantage of the context information to reconstruct the signal in a non-linear (e.g., a learned) way. For example, they learn whether the spectrum comes from actual low frequencies and should thus be reconstructed as low frequencies of the up-sampled signal or comes from the high part of the spectrum and should thus be reconstructed as high frequencies of the up-sampled signal.

Thus, in certain instances, the use of down-sampling with point-sampling at the training stage can pack up to twice as much information in the same storage space compared to a conventional sampling approach. In certain instances, the high-resolution images used during training may be prepared following similar techniques to those discussed above (e.g., using frequencies beyond the sampling limit). Providing that the images won't be resampled inappropriately later on through the display process.

Additional Example Embodiments

The processing discussed above generally relates to data (e.g., signals) in two dimensions (e.g., images). The techniques herein (e.g., the use of SBT's) may also be applied to data or signals of other dimensions, for example, 1D (e.g., speech recognition, anomaly detection on time series, etc. . . . ) and 3D (e.g., video, 3D textures) signals. The techniques may also be applied in other types of 2D domains such as, for example, image classification, object detection and image segmentation, face tracking, style transfer, posture estimation, etc.)

The processing discussed in connection with FIGS. 2 and 9 relates to upconverting images from 540p to 1080. However, the techniques discussed herein may be used in other scenarios including: 1) converting to different resolutions than those discussed (e.g., from 480p to 720p or 1080p and variations thereof, etc.), 2) downconverting images to a different resolution, 3) converting images without changes in resolution; 4) images with other values for how the image is represented (e.g., grayscale).

In certain example embodiments, the techniques herein may be applied to processing images (e.g., in real-time and/or during runtime of an application/video game) to provide anti-aliasing capability. In such an example, the size of the image before and after remains the same—but with anti-aliasing applied to the final image. Training for such a process may proceed by taking relatively low-quality images (e.g., those rendered without anti-aliasing) and those rendered with high quality anti-aliasing (or a level of anti-aliasing that is desirable for a given application or use) and training a neural network (e.g. L&R as discussed above).

Other examples of fixed resolution applications (e.g., converting images from x resolution to x resolution) may include denoising (e.g., in conjunction with a ray-tracing process that is used by a rendering engine in a game engine). Another application of the techniques herein may include deconvolution, for example in the context of deblurring images and the like.

During run time the source images are then used to prepare input channels in a manner similar to that shown in FIG. 3. Specifically, each image is divided into blocks (e.g., 4×4) and context data is added to those blocks to create an 8×8 context block. The subsequent context block is then split into 4 input channels, with 3 channel colors per channel to create 12 input channels. Those 12 input channels are then reorganized into a 16×16 matrix of activations in a manner similar to that shown in FIG. 4. The matrix of activations is then run through the neural network where the separable block transform is performed with the L and R matrices that have been developed via the above discussed training.

Once the matrix of activations has been transformed, then the first 3 (or any 3, which may be based on training) output channels (e.g., the RGB values that correspond to the "1" pixels) are reorganized into their respective blocks and combined into a single 4×4 block. This process is repeated for each of the original 4×4 blocks that were taken from the source image. The transformed blocks are combined together to thereby create the resulting image that may then be output.

In certain example embodiments, a classification process (e.g., finding/identifying an object in an image) may be used in combination with the SBT techniques discussed herein. For example, a given image may be split into 4×4 pixel blocks and a sliding 3×3 block kernel transform can be applied to all of the image blocks. In certain examples, the kernel may have other sizes (e.g., kernel can have other sizes, like 2×2, or separable with 3×1 followed by 1×3).

In this example, the 8 blocks that surround a given block (e.g., 3×3 surrounding blocks) and the block itself are processed with SBT and the results are summed into a single target block (e.g., that corresponds to the position of the selected block). Accordingly, the 16×16 block values are summed term to term.

For blocks on edge of the image, the blocks outside of the image may be ignored.

In certain example embodiments, one or more block-convolutional layers can be alternated with reduction layers of various types. For example, max or average pooling may be used or down sampling with stride or other similar techniques may be used.

In certain example embodiments, the neural network may include one or more normalization layers. Such layers may be generated by using batch normalization, weight normalization, layer normalization, group normalization, instance normalization, batch-instance normalization, etc.

In certain example embodiments, layer fusion can be implemented between successive block-convolutional layers to further reduce the pressure on memory bandwidth (e.g., DRAM).

In certain example embodiments, residual connections (e.g., a skip connection) can be added between SBT layers to facilitate training of deeper models.

For stride implementations, the output image may have two times less blocks in horizontal and vertical dimensions. Thus, if the block convolution layers are alternated with block stride layers (e.g., several times), the final image may end up with only one block of 16×16 activations. In certain example embodiments, the final block can then be used as an input of a traditional fully-connected layer with the output neurons count matching a number of classes (e.g., for classification applications).

For 16×16 matrices, if the number of classes is equal or below 16, then the output classes may be put into the diagonal coefficients of the matrix. This may let the SBT training learn the equivalent of a fully-connected layer in the L and/or R matrices (even with a single LXR element without a sum). More generally, for a number of classes above 16 and below or equal to 256, an SBT with up to 256 sum elements may be used (which becomes equivalent to a fully connected network of 256 neurons). For a number of classes below 256, sums of fewer than 256 LXR terms are likely to fit the problem well and the optimal number of terms may be found. In certain example embodiments, finding the optimal number of terms may be accomplished by pruning LXR sums. In certain example embodiments, finding the optimal number of terms may be accomplished by Singular Value Decomposition (or matrix spectral decomposition) of a trained fully-connected layer to determine the number of "significant" singular values (e.g., those not close to zero) and training the corresponding number of LXR terms (for example, 2 LXR terms for 32 significant singular values).

For pooling implementations, each group of 2×2 blocks is reduced into a single block by calculating the average (or the max) of corresponding terms. Accordingly, in certain example embodiments, block convolution layers may be alternated with block pooling layers (e.g., several times) and the final image may end up with only one block of 16×16 activations. Similar to the stride implementation, this final 16×16 activation may be used as an input of a traditional fully-connected layer with the output neurons count matching a desired number of classes (e.g., for classification applications).

It will be appreciated that software implementation speed and/or the hardware cost of dedicated acceleration may be related to activation precision. In other words, FP32 costs more than FP16 which costs more than INT8. In certain example embodiments, using INT8 may provide an attractive sweet-spot in terms the tradeoffs between speed/quality and/or cost/quality.

In certain instances, low and high resolution output from a game engine may be used for training purposes (e.g., instead of down sampling). However, such an approach may result in discrepancies and/or may impair training. The images produced in such a manner may alleviate these problems if the rendering engine that produces the images is "resolution independent."

It will be appreciated that while the specific example embodiments discussed in connection with FIGS. 2 and 9 are provided in the context of converting 540p images to 1080p images that the techniques discussed herein may apply to converting other resolutions into new resolutions. For example, whenever 540p is mentioned herein, similar techniques may be applied to 1080p source images. Also, whenever 1080p is mentioned in connection with a target image, the techniques discussed herein may also be applied to 4k images (e.g., 3840×2160).

In certain example embodiments, the conversion techniques discussed herein may operate in a two-step process. In certain examples, a first image (e.g., a 1080p image) may be converted to, for example, an 8k image. Such a process may include first converting 1080p image to a 4k image and then converting the resulting 4k image to an 8k image in accordance with the techniques discussed herein.

Description of FIG. 13

FIG. 13 is a block diagram of an example computing device 1300 (which may also be referred to, for example, as a "computing device," "computer system," or "computing system") according to some embodiments. In some embodiments, the computing device 1300 includes one or more of the following: one or more processors 1302; one or more memory devices 1304; one or more network interface devices 1306; one or more display interfaces 1308; and one or more user input adapters 1310. Additionally, in some embodiments, the computing device 1300 is connected to or includes one or more display devices 1312. Additionally, in some embodiments, the computing device 1300 is connected to or includes one or more input devices 1314. In some embodiments, computing device 1300 may be connected to one or more external devices 1316. As will explained below, these elements (e.g., the processors 1302, memory devices 1304, network interface devices 1306, display interfaces 1308, user input adapters 1310, display devices 1312, input devices 1314, external devices 1316) are hardware devices (for example, electronic circuits or combinations of circuits) that are configured to perform various different functions for and/or in conjunction with the computing device 1300.

In some embodiments, each or any of the processors 1302 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes, for example, a CPU, a GPU, and other hardware components such as memory and/or a memory controller (e.g., Northbridge), I/O controller (e.g., Southbridge), networking interfaces, and the like). In some embodiments, each or any of the processors 1302 uses an instruction set architecture such as x86 or Advanced RISC Machine (ARM). In some embodiments, each or any of the processors 1302 is or includes, for example, a graphical processing unit (GPU), which may be an electronic circuit designed to generate images and the like. One or more of the processors 1302 may be referred to as hardware processors and one or more of processors 1302 may be used to form a processing system in certain examples.

In some embodiments, each or any of the memory devices 1304 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions or data that may be executed or used by one or more of the processors 1302), or other type of device that performs the volatile or non-volatile storage of data and/or instructions (e.g., software that is executed on or by processors 1302). Memory devices 1304 are an example of non-transitory computer-readable storage. Memory devices as discussed herein may include memory that is provided on the same "die" as the processor (e.g., that is internal to the die that the processor is located on) and memory that is externally provided to the die that includes the processor. Examples of "on die" memory may include cache and registers whereas "off die" or external memory may include DRAM. As discussed herein, on die memory in the form of cache or registers may provide faster access at a tradeoff of being more expensive to produce.

In some embodiments, each or any of the network interface devices 1306 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (e.g., IEEE 802.11), GSM, CDMA2000, UMTS, LTE, LTE-Advanced (LTE-A), and/or other short-range (e.g., Bluetooth Low Energy, RFID), mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1308 is or includes one or more circuits that receive data from the processors 1302 (e.g., via a discrete GPU, an integrated GPU, a CPU executing graphical processing, or the like) that are used to generate corresponding image data based on the received data, and/or output (e.g., a High-Definition Multimedia Interface (HDMI), a DisplayPort Interface, a Video Graphics Array (VGA) interface, a Digital Video Interface (DVI), or the like) the generated image data to the display device 1312, which displays the image data thereon. Alternatively or additionally, in some embodiments, each or any of the display interfaces 1308 is or includes, for example, a video card, video adapter, or graphics processing unit (GPU). In other words, the each or any of the display interfaces 1308 may include a processor therein that is used to generate image data. The generation of such images may occur in conjunction with processing performed by one or more of the processors 1302.

In some embodiments, each or any of the user input adapters 1310 is or includes one or more circuits that receive and process user input data from one or more user input devices (1314) that are included in, attached to, or otherwise in communication with the computing device 1300, and that output data based on the received input data to the processors 1302. Alternatively or additionally, in some embodiments each or any of the user input adapters 1310 is or includes, for example, a PS/2 interface, a USB interface, a touchscreen controller, or the like; and/or the user input adapters 1310 facilitates input from user input devices 1314.

In some embodiments, the display device 1312 may be a Liquid Crystal Display (LCD) display, Light Emitting Diode (LED) display, or other type of display device. In embodiments where the display device 1312 is a component of the computing device 1300 (e.g., the computing device and the display device are included in a unified housing), the display device 1312 may be a touchscreen display or non-touchscreen display. In embodiments where the display device 1312 is connected to the computing device 1300 (e.g., is external to the computing device 1300 and communicates with the computing device 1300 via a wire and/or via wireless communication technology), the display device 1312 is, for example, an external monitor, projector, television, display screen, etc.

In some embodiments, each or any of the input devices 1314 is or includes machinery and/or electronics that generates a signal that is provided to the user input adapter(s) 1310 in response to physical phenomenon. Examples of inputs devices 1314 include, for example, a keyboard, a mouse, a trackpad, a touchscreen, a button, a joystick, a sensor (e.g., an acceleration sensor, a gyro sensor, a temperature sensor, and the like). In some examples, one or more input devices 1314 generate signals that are provided in response to a user providing an input—for example, by pressing a button or actuating a joystick. In other examples, one or more input devices generate signals based on sensed physical quantities (e.g., such as force, temperature, etc. . . . ). In some embodiments, each or any of the input devices 1314 is a component of the computing device (for example, a button is provide on a housing that includes the processors 1302, memory devices 1304, network interface devices 1306, display interfaces 1308, user input adapters 1310, and the like).

In some embodiments, each or any of the external device(s) 1316 includes further computing devices (e.g., other instances of computing device 1300) that communicate with computing device 1300. Examples may include a server computer, a client computer system, a mobile computing device, a cloud-based computer system, a computing node, an Internet of Things (IoT) device, etc. that all may communicate with computing device 1300. In general, external devices(s) 1316 may include devices that communicate (e.g., electronically) with computing device 1300. As an example, computing device 1300 may be a game device that communicates over the Internet with a server computer system that is an example of external device 1316. Conversely, computing device 1300 may be a server computer system that communicates with a game device that is an example external device 1316.

In various embodiments, the computing device 1300 includes one, or two, or three, four, or more of each or any of the above-mentioned elements (e.g., the processor(s) 1302, memory device(s) 1304, network interface device(s) 1306, display interface(s) 1308, user input adapter(s) 1310, display device(s) 1312, input device(s) 1314). Alternatively or additionally, in some embodiments, the computing device 1300 includes one or more of: a processing system that includes the processors 1302; a memory or storage system that includes the memory devices 1304; and a network interface system that includes the network interface devices 1306.

The computing device 1300 may be arranged, in various embodiments, in many different ways. As just one example, the computing device 1300 may be arranged such that the processors 1302 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1300 may be arranged such that: the processors 1302 include two, three, four, five, or more multi-core processors; the network interface devices 1306 include a first network interface device that implements Ethernet and a second network interface device that implements WiFi and/or Bluetooth; and the memory devices 1304 include a RAM and a flash memory or hard disk. As another example, the computing device 1300 may include a SoC with one or processors 1302, plural network interface devices 1306, memory devices 1304 that include system memory and memory for application programs and other software, a display interface 13068 that is configured to output a video signal, a display device 1312 that is integrated to a housing with the mentioned and layered with a touch screen input device 1314, and multiple input device 1314 such as one or more joysticks, one or more buttons, and one or more sensors.

As previously noted, whenever it is described in this document that a software module or software process performs any action, the action is in actuality performed by underlying hardware elements according to the instructions that comprise the software module. Consistent with the foregoing, in various embodiments, each or any combination of the game device 100, game engine 110, neural network 112, input device 114, video game application 108, neutral network trainer 904, dataset prep module 902, etc., each of which will be referred to individually for clarity as a "component" for the remainder of this paragraph, are implemented using an example of the computing device 1300 of FIG. 13. In such embodiments, the following applies for each component: (a) the elements of the 1300 computing device 1300 shown in FIG. 13 (i.e., the one or more processors 1302, one or more memory devices 1304, one or more network interface devices 1306, one or more display interfaces 1308, and one or more user input adapters 1310), or appropriate combinations or subsets of the foregoing, with or without the one or more display devices 1312, one or more input devices 1314, and/or external devices 1316) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1304 (e.g., in various embodiments, in a volatile memory device such as a RAM or an instruction register and/or in a non-volatile memory device such as a flash memory or hard disk) and all actions described herein as performed by the software modules are performed by the processors 1302 in conjunction with, as appropriate, the other elements in and/or connected to the computing device 1300 (e.g., the network interface devices 1306, display interfaces 1308, user input adapters 1310, display device(s) 1312, input device(s) 1314, and/or external device(s) 1316); (c) alternatively or additionally, to the extent it is described herein that the component processes and/or otherwise handles data, in some embodiments, such data is stored in the memory devices 1304 (e.g., in some embodiments, in a volatile memory device such as a RAM and/or in a non-volatile memory device such as a flash memory or hard disk) and/or is processed/handled by the processors 1302 in conjunction, as appropriate, the other elements in and/or connected to the computing device 1300 (e.g., the network interface devices 1306, display interfaces 1308, user input adapters 1310, display device 512, input device(s) 1314, and/or external device(s) 1316); (d) alternatively or additionally, in some embodiments, the memory devices 1302 store instructions that, when executed by the processors 1302, cause the processors 1302 to perform, in conjunction with, as appropriate, the other elements in and/or connected to the computing device 1300 (e.g., the memory devices 1304, network interface devices 1306, display interfaces 1308, user input adapters 1310, display device(s) 1312, input device(s) 1314, and/or external device(s) 1316), each or any combination of actions described herein as performed by the component and/or by any software modules described herein as included within the component.

The hardware configurations shown in FIG. 13 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 13, (e) via other hardware arrangements, architectures, and configurations, and/or via combinations of the technology described in (a) through (e).

Technical Advantages of Described Subject Matter

In certain example embodiments, new techniques for transforming, converting, or otherwise processing data from a source signal are provided. Such techniques may include processing the data of the source signal in blocks and applying two separate learned matrices (e.g., a pair per layer of a trained neural network) to an activation matrix that is based on the blocked signal data to thereby generate an output matrix. One of the learned matrices is applied on the left of the activation matrix and the other is applied on the right. The sizes of the matrices (both the learned and the activation matrices) may be selected to take advantage of hardware acceleration. The techniques may also advantageously process superposable patterns of data (e.g., which may be, for example, a pixel) from the source signal.

In certain example embodiments, the arrangement of the blocks of data of a signal (e.g., pixel data) may more effectively use the processing capacity of certain processors (e.g., GPUs). For example, a GPU may operate close to 100% (e.g., at least 90 or 95 percent) instead of leaving the extra processing capacity unused (e.g., which may be viewed as a waste of time and/or resources). Thus, closer to the theoretical maximum processing throughput may be achieved according to certain example embodiments discussed herein (e.g., in connection with using separable block transforms as opposed to conventional neural network approaches).

In certain example embodiments, images may be divided into blocks to improve how transforms are applied during the running of a neural network. In certain example embodiments, the size of the blocks may be determined based on the smallest size matrix that may be used in the hardware that is handling the matrix operations (e.g., a GPU or ASIC, etc.). In certain examples, an atomic operation that is performed on the input data from a 1080p source image may be in a relatively quick time frame to allow for real-time images processing (e.g., an example atomic operation may be performed in less than about 0.04 ms).

The techniques herein allow for a flexible approach in training models (e.g., neural networks) that may be tailored to different use cases. As an example, different neural networks may be trained to handle different types of games. One model may handle platformer games and another may handle first person games. Using different models for different use cases (including specific models for specific games) may allow for increased accuracy of the resulting images.

The techniques discussed herein may provide for advantages in terms of processing. For example, the processing may operate on a relatively small grain by using, for example, $16\times16\times16=4096$ multiplications per matrix product. Accordingly, $2\times4096/16=512$ multiplications/pixel for each "atomic operation." And $2\times16\times16=512$ weights, thus 1 KByte per atomic operation in FP16. Such processing may be scaled up as needed by increasing the width & depth of the network in multiples of the atomic operation.

The techniques herein may also advantageously operate with a lower overhead on DRAM of a computer system as the data that is being operated on during application of the neural network to the activation matrix remains in the registers (e.g., internal memory) of the GPU (or other suitable hardware that is performing the matrix operations).

In certain example embodiments, the techniques herein may provide for decreasing the overall amount of storage space (e.g., file size) that is needed for producing images at a higher resolution size. For example, an application that generates images at a higher resolution may also require assets (e.g., texture data) that are correspondingly sized for generation of such high resolution images. Thus, by decreasing the image size that an example application renders, the data that used for such rendering may be similarly decreased in size and may thus take up less memory or storage space. For example, the size of textures used by a rendering engine may be decreased. Accordingly, the overall size that is needed to deliver an application (e.g., video game) may be decreased so as to fit onto relatively smaller sized physical media (e.g., in terms of how much storage space is provided) and/or require a decreased amount of bandwidth or data to download. As an illustrative example, a video game that is designed to output images at 4k natively may have a total size of 60 GB. However, if the size of the images produced by the video game engine are 1080p, then the total size needed for the video game may decreased to, for example, 20 GB. Even if images are then output by the video game engine at 1080p, the techniques herein may be used to transform such images to 4k images during runtime.

In certain example embodiments, the nature for how the data is prepared and use of the SBT may take increased advantage of tensor hardware acceleration that is present in certain GPU hardware. For example, in NVIDIA's CUDA architecture, the atomic Neural Network operation is a 16×16 matrix product. Certain example embodiments discussed herein are designed to work with this atomic operation. It will be appreciated that other types of hardware may have other sizes of atomic operations and the techniques herein may also be adapted for such processing hardware.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, Cache, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 2-7 and FIGS. 10-12, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer program product stored to a non-transitory storage medium, the computer program product for execution by a processing system that includes at least one hardware processor, the computer program product comprising instructions that, when executed, cause the processing system to perform operations comprising:
generating a plurality of pixel groups from pixel data of a first image, wherein each one of the plurality of pixel groups is based on different areas within the first image, wherein at least two of the pixel groups are generated using data from a common pixel;
for each corresponding pixel group of the plurality of pixel groups:
populating a first activation matrix with a plurality of values that are based on the pixel values from the corresponding pixel group, and
transforming, for each one of multiple layers of a neural network, an input activation matrix into an output activation matrix by using matrix multiplication that is based on the input activation matrix and at least a first learned matrix, wherein the output activation matrix for each layer is used as the input activation matrix for a successive layer of the neural network, wherein the first activation matrix is used as the input activation matrix for a first layer of the multiple layers of the neural network; and
assembling a second image by combining pixel values that are based on each output activation matrix that produced by a last layer of the neural network.

2. The computer program product of claim 1, wherein color values for a corresponding pixel within one of the plurality of pixel groups are split into different rows within the first activation matrix.

3. The computer program product of claim 1, wherein the operations further comprise:
executing an application program to generate the first image; and
output, to a display screen for display thereon, the second image,
wherein second image is output in real-time with the generation of the first image.

4. The computer program product of claim 1, wherein resolution of the first image is the same as resolution of the second image.

5. The computer program product of claim 1, wherein resolution of the first image is less than resolution of the second image.

6. The computer program product of claim 1, wherein the plurality of pixel groups includes a first pixel group that is based on at least 4 pixels and additional context data from additional pixels that surround the at least 4 pixels.

7. The computer program product of claim 6, wherein the at least 4 pixels include those pixels in an x by x block, where x is at least 2.

8. The computer program product of claim 1, wherein at least two rows or columns of the first activation matrix correspond to superposable data from each corresponding pixel group.

9. The computer program product of claim 1, wherein the matrix multiplication that is used to transform the input activation matrix into the output activation matrix is further based on a second learned matrix.

10. The computer program product of claim 9, wherein the first learned matrix is multiplied on the left of the activation matrix and the second learned matrix is multiplied on the right.

11. The computer program product of claim 10, wherein the first learned matrix is a pixel-wise matrix and the second learned matrix is a channel-wise matrix.

12. A computing system comprising:
electronic memory;
a processing system that includes at least one hardware processor, the processing system comprising computer-executable instructions, that, when executed by the at least one hardware processor, cause the at least one hardware processor to perform operations comprising:
generating a plurality of pixel groups from pixel data of a first image, wherein each one of the plurality of pixel groups is based on different areas within the first image, wherein at least two of the pixel groups are generated using data from a common pixel;
for each corresponding pixel group of the plurality of pixel groups:
populating a first activation matrix with a plurality of values that are based on the pixel values from the corresponding pixel group, and
transforming, for each one of multiple layers of a neural network, an input activation matrix into an output activation matrix by using matrix multiplication that is based on the input activation matrix and at least a first learned matrix, wherein the output activation matrix for each layer is used as the input activation matrix for a successive layer of the neural network, wherein the first activation matrix is used as the input activation matrix for a first layer of the multiple layers of the neural network; and
assembling a second image by combining pixel values that are based on each output activation matrix that produced by a last layer of the neural network.

13. The computing system of claim 12, wherein color values for a corresponding pixel within one of the plurality of pixel groups are split into different rows within the first activation matrix.

14. The computing system of claim 12, wherein the operations further comprise:
executing an application program to generate the first image; and
output, to a display screen for display thereon, the second image,
wherein second image is output in real-time with the generation of the first image.

15. The computing system of claim 12, wherein resolution of the first image is the same as resolution of the second image.

16. The computing system of claim 12, wherein resolution of the first image is less than resolution of the second image.

17. The computing system of claim 12, wherein the plurality of pixel groups includes a first pixel group that is based on at least 4 pixels and additional context data from additional pixels that surround the at least 4 pixels.

18. The computing system of claim 17, wherein the at least 4 pixels include those pixels in an x by x block, where x is at least 2.

19. The computing system of claim 12, wherein the at least one hardware processor includes a graphical processing unit that includes at least one hardware register, wherein data from each corresponding pixel group that is initially populated to the first activation matrix is maintained within the at least one hardware register throughout the transformation of the first activation matrix to the output activation matrix that produced by a last layer of the neural network.

20. A method of transforming image data, the method comprising:
generating a plurality of pixel groups from pixel data of a first image, wherein each one of the plurality of pixel groups is based on different areas within the first image, wherein at least two of the pixel groups are generated using data from a common pixel;
for each corresponding pixel group of the plurality of pixel groups:
populating a first activation matrix with a plurality of values that are based on the pixel values from the corresponding pixel group, and
transforming, for each one of multiple layers of a neural network, an input activation matrix into an output activation matrix by using matrix multiplication that is based on the input activation matrix and at least a first learned matrix, wherein the output activation matrix for each layer is used as the input activation matrix for a successive layer of the neural network, wherein the first activation matrix is used as the input activation matrix for a first layer of the multiple layers of the neural network; and
assembling a second image by combining pixel values that are based on each output activation matrix that produced by a last layer of the neural network.

* * * * *